(12) United States Patent
Kamiyama

(10) Patent No.: US 8,446,499 B2
(45) Date of Patent: May 21, 2013

(54) IMAGE CAPTURING APPARATUS, IMAGE CAPTURING SYSTEM, AND PROCESSING METHOD

(75) Inventor: Tomoyuki Kamiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 468 days.

(21) Appl. No.: 12/898,779

(22) Filed: Oct. 6, 2010

(65) Prior Publication Data

US 2011/0085043 A1    Apr. 14, 2011

(30) Foreign Application Priority Data

Oct. 8, 2009   (JP) ................................ 2009-234365

(51) Int. Cl.
*H04N 9/083*     (2006.01)
*H04N 3/14*      (2006.01)
*H04N 5/335*     (2011.01)
*H04N 9/04*      (2006.01)

(52) U.S. Cl.
USPC ........................................ 348/279; 348/271

(58) Field of Classification Search .................. 348/271, 348/279
See application file for complete search history.

(56) References Cited

U.S. PATENT DOCUMENTS 5,136,370 A * 8/1992 Chi ................................ 348/279
2007/0285540 A1 * 12/2007 Kwon et al. .................. 348/272

FOREIGN PATENT DOCUMENTS

| JP | 20060024832 A1 | 1/2006 |
| JP | 2007-027667 | 2/2007 |
| JP | 200800289000 A1 | 11/2008 |

OTHER PUBLICATIONS

Notice Of Allowance for JP Application No. 2009-234365, Dated Nov. 13, 2012.

* cited by examiner

*Primary Examiner* — Anthony J Daniels
(74) *Attorney, Agent, or Firm* — Squire Sanders (US) LLP

(57) ABSTRACT

An image capturing apparatus includes an infrared cutoff filter, an image capturing device having a plurality of pixels for detecting light transmitted through the infrared cutoff filter, and four optical filters disposed on a light-detecting surface of the image capturing device. The four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than a fourth wavelength. The infrared cutoff filter transmits light having a wavelength shorter than a fifth wavelength. A processor calculates blue-, green-, red-, and infrared-component pixel signals from pixel signals that are produced by the pixels of the image capturing device.

12 Claims, 11 Drawing Sheets

| W | Y | W | Y | W | Y | W | Y |
|---|---|---|---|---|---|---|---|
| R | IR1 | R | IR1 | R | IR1 | R | IR1 |
| IR2 | | IR12 | | IR12 | | IR12 | |
| W | Y | W | Y | W | Y | W | Y |
| R | IR1 | R | IR1 | R | IR1 | R | IR1 |
| IR2 | | IR12 | | IR12 | | IR12 | |

IMAGE CAPTURING APPARATUS, IMAGE CAPTURING SYSTEM, AND PROCESSING METHOD

CROSS-REFERENCE TO RELATED APPLICATION

This application is based upon and claims the benefit of priority from Japanese Patent Application No. 2009-234365 filed on Oct. 8, 2009, of which the contents are incorporated herein by reference.

BACKGROUND OF THE INVENTION

1. Field of the Invention

The present invention relates to an image capturing apparatus with color filters, an image capturing system with color filters, and a processing method.

2. Description of the Related Art

Heretofore, a technology has existed for detecting incident light, light transmitted through a yellow filter, light transmitted through a red filter, and light transmitted through a corrective filter, and then calculating R, G, B values based on the detected light, as disclosed in Japanese Laid-Open Patent Publication No. 2007-027667.

However, although the technology disclosed in Japanese Laid-Open Patent Publication No. 2007-027667 can obtain R, G, B values, the technology is unable to obtain a signal representative of infrared light.

SUMMARY OF THE INVENTION

It is an object of the present invention to provide an image capturing apparatus, an image capturing system, and a calculating method, which are capable of obtaining R, G, B values as well as a signal representative of infrared light.

To achieve the above object, there is provided in accordance with the present invention an image capturing apparatus comprising an infrared cutoff filter, an image capturing device having a plurality of pixels for detecting light transmitted through the infrared cutoff filter, four optical filters disposed on a light-detecting surface of the image capturing device, the four optical filters having different filter characteristics, and a processor for processing pixel signals generated by the pixels of the image capturing device. The four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than a fourth wavelength. The infrared cutoff filter transmits light having a wavelength shorter than a fifth wavelength. The processor comprises a blue-component calculator for calculating a blue-component pixel signal by subtracting a pixel signal output from the pixel that detects light transmitted through the first filter from a pixel signal output from the pixel that detects light applied to the infrared cutoff filter, a green-component calculator for calculating a green-component pixel signal by subtracting a pixel signal output from the pixel that detects light transmitted through the second filter from the pixel signal output from the pixel that detects light transmitted through the first filter, and a red-component calculator for calculating a red-component pixel signal by subtracting a pixel signal output from the pixel that detects light transmitted through the third filter from the pixel signal output from the pixel that detects light transmitted through the second filter. The first wavelength, the second wavelength, the third wavelength, the fourth wavelength, and the fifth wavelength are related to each such that the first wavelength<the second wavelength<the third wavelength<the fourth wavelength<the fifth wavelength.

The fourth wavelength comprises a wavelength in the infrared range, and the pixel that detects light transmitted through the fourth filter detects infrared radiation having a wavelength longer than the fourth wavelength and shorter than the fifth wavelength.

To achieve the above object, there further is provided in accordance with the present invention an image capturing system comprising the above-described image capturing apparatus, a controller for controlling the image capturing device, and a light-emitting apparatus for emitting infrared radiation toward a subject for a prescribed period, the infrared radiation including radiation having a wavelength longer than the fourth wavelength and shorter than the fifth wavelength. The image capturing device includes a plurality of first pixels for detecting the light applied to the infrared cutoff filter, the light transmitted through the first filter, the light transmitted through the second filter, and the light transmitted through the third filter, and a plurality of second pixels for detecting the light transmitted through the fourth filter. The controller controls the first pixels so as not to store photoelectrons produced thereby during a first period in which reflected light of at least the radiation emitted from the light-emitting apparatus is applied to the image capturing device, and to store photoelectrons produced thereby during a second period in which the reflected light that is not applied to the image capturing device, for thereby obtaining luminance information of ambient light, which is independent of the reflected light.

Each of the first pixels comprises a first photodetector, a first capacitor for storing a photoelectron generated by the first photodetector, a first switching element for transferring the photoelectron generated by the first photodetector to the first capacitor, a first photoelectron discharger for discharging the photoelectron generated by the first photodetector, and a second switching element for discharging the photoelectron generated by the first photodetector from the first photoelectron discharger. The controller turns off the first switching element and turns on the second switching element in the first period to discharge the photoelectron generated by the first photodetector from the first photoelectron discharger, and turns off the second switching element and turns on the first switching element in the second period to transfer the photoelectron generated by the first photodetector to the first capacitor, for thereby obtaining luminance information of the ambient light, which is independent of the reflected light, based on the amount of photoelectron stored in the first capacitor.

The controller controls the second pixels to expose second photodetectors of the second pixels during a third period in which the reflected light is not applied to the image capturing device and during a fourth period that is equal to the third period and in which at least the reflected light is applied to the image capturing device. The processor obtains luminance information of the ambient light, which is independent of the reflected light, by subtracting pixel signals produced by the second photodetectors in the third period from pixel signals produced by the second photodetectors in the fourth period.

Each of the second pixels, which include the second photodetectors, comprises a second capacitor and a third capacitor for storing a photoelectron generated by the second photodetector, a second photoelectron discharger for discharging the photoelectron generated by the second photodetector, a third switching element for transferring the photoelectron generated by the second photodetector to the second capacitor, a fourth switching element for transferring the photoelectron generated by the second photodetector to the third capacitor, and a fifth switching element for discharging the photoelectron generated by the second photodetector from the second photoelectron discharger. The controller turns off the fourth and fifth switching elements and turns on the third switching element in the third period to transfer the photoelectron generated by the second photodetector to the second capacitor, turns off the third and fifth switching elements and turns on the fourth switching element in the fourth period to transfer the photoelectron generated by the second photodetector to the third capacitor, and turns off the third and fourth switching elements and turns on the fifth switching element in a period other than the third period and the fourth period to discharge the photoelectron generated by the second photodetector from the second photoelectron discharger. The processor obtains luminance information of the ambient light, which is independent of the reflected light, by subtracting a pixel signal based on an amount of photoelectron transferred to the second capacitor from a pixel signal based on an amount of photoelectron transferred to the third capacitor.

The controller controls the second pixels to expose second photodetectors of the second pixels during a sixth period in which the reflected light is not applied to the image capturing device, a seventh period in which the reflected light is not applied to the image capturing device, an eighth period that is equal to the sixth period and in which at least the reflected light is applied to the image capturing device, and a ninth period from a time at which the light-emitting apparatus stops emitting infrared radiation to a time at which a period equal to the seventh period is completed. The ninth period includes a period Psr in which the reflected light is applied to the image capturing device and a period Ps in which the reflected light is not applied to the image capturing device. The processor acquires amount-of-light information of the reflected light in the eighth period by subtracting pixel signals produced by the second photodetectors in the sixth period from pixel signals produced by the second photodetectors in the eighth period. The processor further acquires amount-of-light information of the reflected light during the period Psr in which the light-emitting apparatus stops emitting infrared radiation and then the reflected light is applied to the image capturing device, by subtracting pixel signals produced by the second photodetectors in the seventh period from pixel signals produced by the second photodetectors in the ninth period. The processor calculates a distance to the subject based on the ratio of the amount-of-light information of the reflected light in the eighth period and the amount-of-light information of the reflected light during the period Psr, and also based on the eighth period.

Each of the second pixels further comprises a sixth capacitor, a seventh capacitor, an eighth capacitor, and a ninth capacitor for storing a photoelectron generated by the second photodetector, a second photoelectron discharger for discharging the photoelectron generated by the second photodetector, a sixth switching element for transferring the photoelectron generated by the second photodetector to the sixth capacitor, a seventh switching element for transferring the photoelectron generated by the second photodetector to the seventh capacitor, an eighth switching element for transferring the photoelectron generated by the second photodetector to the eighth capacitor, a ninth switching element for transferring the photoelectron generated by the second photodetector to the ninth capacitor, and a tenth switching element for discharging the photoelectron generated by the second photodetector from the second photoelectron discharger. The controller turns off the seventh through tenth switching elements and turns on the sixth switching element in the sixth period to transfer the photoelectron generated by the second photodetector to the sixth capacitor. The controller turns off the sixth switching element and the eighth through tenth switching elements and turns on the seventh switching element in the seventh period to transfer the photoelectron generated by the second photodetector to the seventh capacitor. The controller turns off the sixth and seventh switching elements and the ninth and tenth switching elements and turns on the eighth switching element in the eighth period to transfer the photoelectron generated by the second photodetector to the eighth capacitor. The controller turns off the sixth through eighth switching elements and the tenth switching element and turns on the ninth switching element to transfer the photoelectron generated by the second photodetector to the ninth capacitor. The controller turns off the sixth through ninth switching elements and turns on the tenth switching element in a period other than the sixth through ninth periods to discharge the photoelectron generated by the second photodetector from the second photoelectron discharger. The processor acquires the amount-of-light information of the reflected light in the eighth period by subtracting a pixel signal based on the amount of photoelectron transferred to the sixth capacitor from a pixel signal based on the amount of photoelectron transferred to the eighth capacitor. The processor acquires the amount-of-light information of the reflected light in the period Psr by subtracting a pixel signal based on the amount of photoelectron transferred to the seventh capacitor from a pixel signal based on the amount of photoelectron transferred to the ninth capacitor.

The light-emitting apparatus emits infrared radiation in predetermined cyclic periods, and the controller and the processor operate in each of the predetermined cyclic periods.

The light-emitting apparatus emits infrared radiation as pulsed radiation for the prescribed period, the prescribed period being equal to or shorter than one percent of each of the predetermined cyclic periods.

To achieve the above object, there is further provided in accordance with the present invention a method of processing pixel signals in an image capturing apparatus including an infrared cutoff filter, an image capturing device having a plurality of pixels for detecting light transmitted through the infrared cutoff filter, and four optical filters disposed on a light-detecting surface of the image capturing device, the four optical filters having different filter characteristics. The four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than a fourth wavelength. The infrared cutoff filter transmits light having a wavelength shorter than a fifth wavelength. The first wavelength, the second wavelength, the third wavelength, the fourth wavelength, and the fifth wavelength are related to each other such that the first wavelength<the second wavelength<the third wavelength<the fourth wavelength<the fifth wavelength. The method comprises the steps of calculating a blue-component pixel signal by subtracting a pixel signal output from the pixel that detects light transmitted through the first filter from a pixel signal output from the pixel that detects light applied to the infrared cutoff filter, calculating a green-component pixel signal by subtracting a pixel signal output from the pixel that detects light transmitted through the second filter from the pixel signal output from the pixel that detects light transmitted through the first filter, and calculating a red-component pixel signal by subtracting a pixel signal output from the pixel that detects light transmitted through the third filter from the pixel signal output from the pixel that detects light transmitted through the second filter.

To achieve the above object, there is further provided in accordance with the present invention a method of processing pixel signals in an image capturing system including an infrared cutoff filter, an image capturing device having a plurality of pixels for detecting light transmitted through the infrared cutoff filter, four optical filters disposed on a light-detecting surface of the image capturing device, the four optical filters having different filter characteristics, a controller for controlling the image capturing device, and a light-emitting apparatus for emitting infrared radiation toward a subject for a prescribed period, the infrared radiation including radiation having a wavelength longer than a fourth wavelength and shorter than a fifth wavelength. The four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than the fourth wavelength. The infrared cutoff filter transmits light having a wavelength shorter than the fifth wavelength. The first wavelength, the second wavelength, the third wavelength, the fourth wavelength, and the fifth wavelength are related to each other such that the first wavelength<the second wavelength<the third wavelength<the fourth wavelength<the fifth wavelength. The image capturing device includes a plurality of first pixels for detecting the light applied to the infrared cutoff filter, the light transmitted through the first filter, the light transmitted through the second filter, and the light transmitted through the third filter, and a plurality of second pixels for detecting the light transmitted through the fourth filter. The method comprises the steps of controlling the first pixels so as not to store photoelectrons produced thereby during a first period in which reflected light of at least the radiation emitted from the light-emitting apparatus is applied to the image capturing device, and to store photoelectrons produced thereby during a second period in which the reflected light is not applied to the image capturing device, calculating a blue-component pixel signal by subtracting a pixel signal output from the pixel that detects light transmitted through the first filter from a pixel signal output from the pixel that detects light applied to the infrared cutoff filter, calculating a green-component pixel signal by subtracting a pixel signal output from the pixel that detects light transmitted through the second filter from the pixel signal output from the pixel that detects light transmitted through the first filter, and calculating a red-component pixel signal by subtracting a pixel signal output from the pixel that detects light transmitted through the third filter from the pixel signal output from the pixel that detects light transmitted through the second filter.

According to the present invention, the image capturing apparatus, the image capturing system, and the calculating method are capable of producing both color images and infrared images.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a diagram showing an on-chip optical filter incorporated in an image capturing device;

DESCRIPTION OF THE PREFERRED EMBODIMENTS

An image capturing system according to a preferred embodiment of the present invention will be described in detail with reference to the accompanying drawings.

Figure 1:
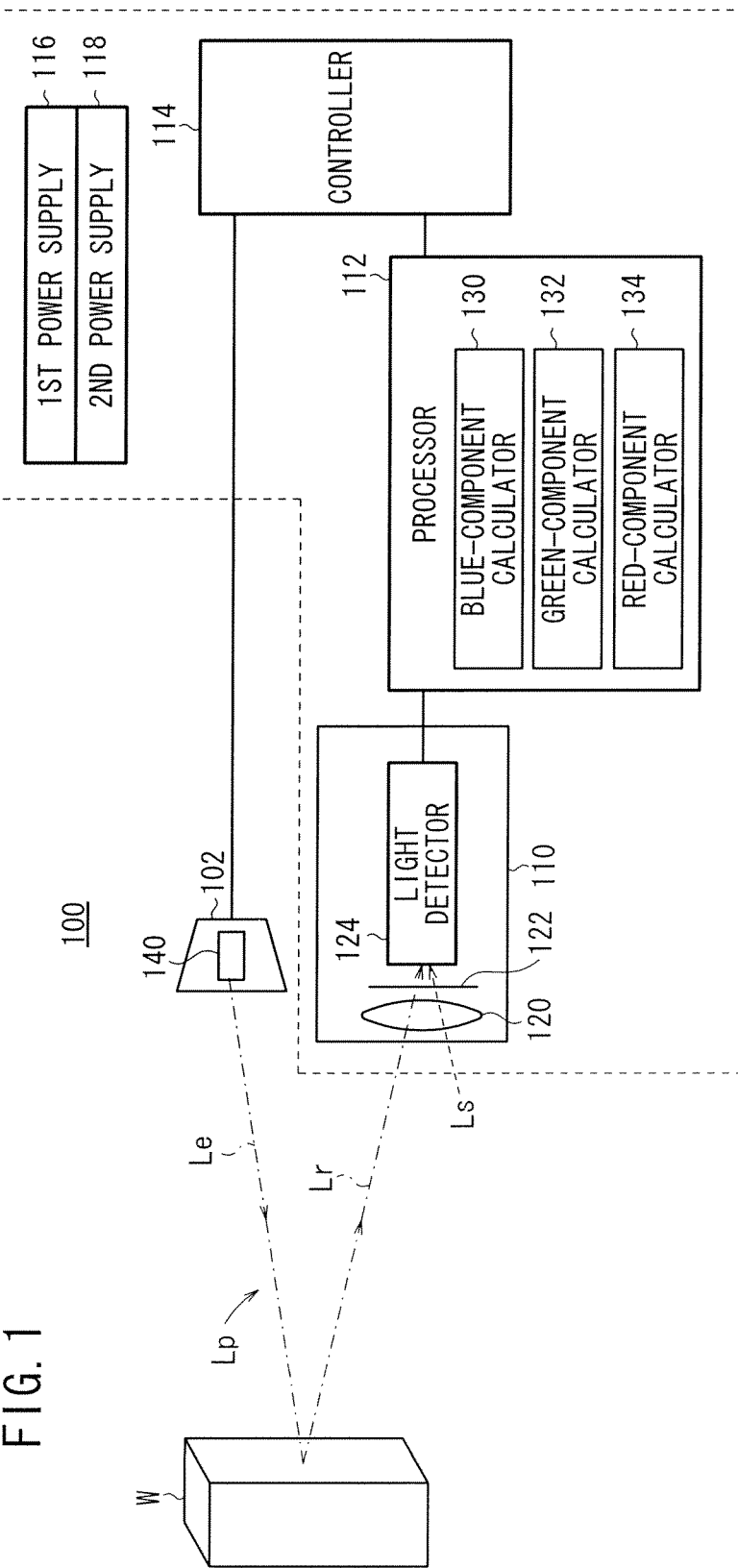
FIG. 1 is a block diagram of an image capturing system according to an embodiment of the present invention.

FIG. 1 is a block diagram of an image capturing system 100 according to an embodiment of the present invention. As shown in FIG. 1, the image capturing system 100 comprises a light-emitting apparatus 102 and an image capturing apparatus 104. The image capturing apparatus 104 comprises a light-detecting apparatus 110, a processor 112, a controller 114, and a first power supply 116 and a second power supply 118 for supplying power supply voltages respectively to the light-emitting apparatus 102, the light-detecting apparatus 110, the processor 112, and the controller 114. For the sake of brevity, power supply lines from the first power supply 116 and the second power supply 118 to the light-emitting apparatus 102, the light-detecting apparatus 110, the processor 112, and the controller 114 have been omitted from illustration in FIG. 1.

The light-emitting apparatus 102 includes a light emitter 140 for emitting pulsed light Lp based on a command from the controller 114. The light emitter 140 comprises a series-connected array of semiconductor laser bars, each comprising a linear row of light-emitting spots (emitters), for providing surface emission.

The light emitter 140 emits infrared radiation as pulsed light Lp. For example, the light emitter 140 emits infrared radiation having a wavelength of 870 nanometers (nm) at an output level of 100 watts (W). The light emitter 140 emits the pulsed light Lp for a pulse duration of 100 nanoseconds. The light emitter 140 has a duty cycle of 0.1(%).

The light emitter 140 may comprise a linear array of light-emitting spots, or a two-dimensional matrix of light-emitting spots. The light-emitting spots may comprise laser diodes, light-emitting diodes, or other light-emitting elements. The light emitter 140 may emit the pulsed light Lp at an output level that lies within a range of from 20 (W) to 10 (kW) or less. The pulsed light Lp emitted from the light emitter 140 may have a pulse duration that lies within a range of from 10 nanoseconds to 1 millisecond. The duty cycle of the light emitter 140 may lie within a range of from 0.01(%) to 1(%).

Pulsed light Lp emitted from the light-emitting apparatus 102 is reflected by a subject W and then applied to the light-detecting apparatus 110. For illustrative purposes, pulsed light Lp that travels from the light-emitting apparatus 102 to the subject W will be referred to as "emitted light Le," whereas pulsed light Lp that travels from the subject W to the light-detecting apparatus 110 will be referred to as "reflected light Lr." Ambient light Ls also is applied to the light-detecting apparatus 110.

The light-detecting apparatus 110 comprises a lens 120, an infrared cutoff filter 122, and a light detector 124. When reflected light Lr and ambient light Ls are applied to the light-detecting apparatus 110, the light Lr and the light Ls pass through the lens 120 and the infrared cutoff filter 122, and then reach the light detector 124. The light detector 124 comprises an image capturing device, and an optical edge filter having four types of filters having different filter characteristics, which are disposed on a light detecting surface of the image capturing device. The four types of filters include a first filter Y, a second filter R, a third filter IR1, and a fourth filter IR2 (see FIG. 3), as described below. The lens 120 may comprise a plurality of lenses arranged in a linear array or in a two-dimensional matrix. The infrared cutoff filter 122 is positioned on an entrance side of the lens 120, i.e., in front of the lens 120.

The processor 112 comprises a blue-component calculator 130, a green-component calculator 132, and a red-component calculator 134 for calculating, respectively, a blue-component pixel signal, a green-component pixel signal, and a red-component pixel signal from pixel signals of pixels 204 (see FIG. 2) representing light that has passed through the first filter Y, the second filter R, and the third filter IR1. The processor 112 also calculates a pixel signal representing reflected light Lr from the pixel signals of the pixels 204, which is indicative of light that has passed through the fourth filter IR2. Furthermore, the processor 112 calculates the distance to the subject W from the pixel signals of the pixels 204, representing light that has passed through the fourth filter IR2. The controller 114 controls various components such as the light-emitting apparatus 102, the light detector 124, etc., of the image capturing system 100. For example, the controller 114 controls the timing and period at which the light-emitting apparatus 102 outputs the emitted light Le, and also controls the timing and period at which the light detector 124 is exposed to the received light Lr. The controller 114 also reads pixel signals, which are stored in the light detector 124.

Figure 2:
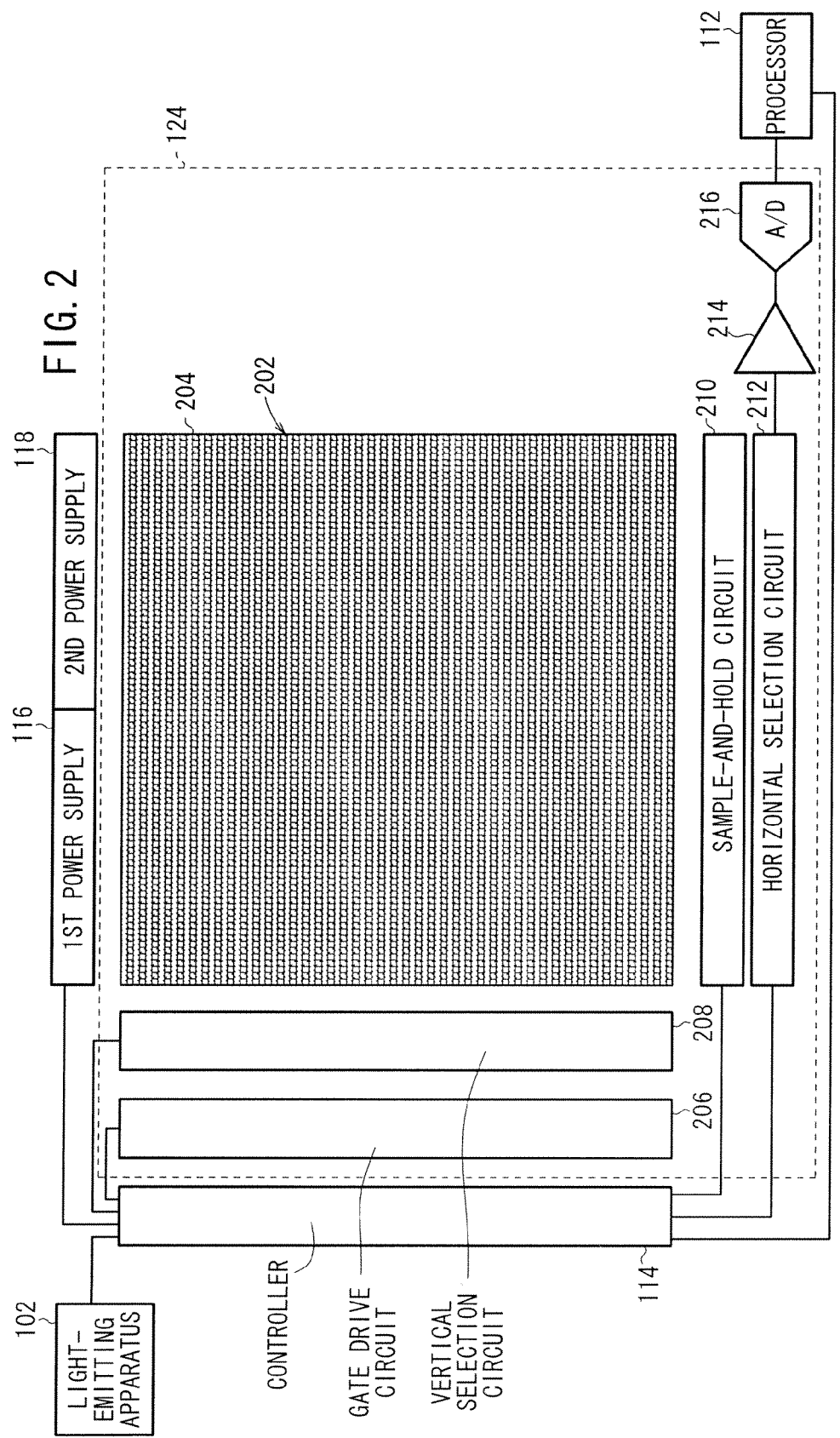
FIG. 2 is a view, partially in block form, showing a light detector.

FIG. 2 is a view, partially in block form, showing the light detector 124. As shown in FIG. 2, the light detector 124 includes an image capturing device 202 comprising a two-dimensional matrix of pixels 204, a gate drive circuit 206, a vertical selection circuit 208, a sample-and-hold circuit 210, a horizontal selection circuit 212, an output buffer 214, and an A/D converter 216.

The first power supply 116 applies a positive power supply voltage Vdd to the image capturing device 202. The second power supply 118 applies a resetting voltage Vr to the image capturing device 202. The gate drive circuit 206 outputs various gate drive signals in order to selectively turn on and off a plurality of switching elements and resetting switches of the image capturing device 202.

The vertical selection circuit 208 includes a multiplexer (not shown) for selecting a row of pixels 204 including pixels from which pixel signals are to be read, and making the selected row of pixels 204 output stored photoelectron signals. The horizontal selection circuit 212 includes another multiplexer (not shown) for selecting a column of pixels 204 from which a pixel signal is to be read. The pixel signals read from the selected pixels 204 are stored in the sample-and-hold circuit 210, and then the pixel signals are output through the horizontal selection circuit 212. The pixel signals then are output through the output buffer 214 and the A/D converter 216 to the processor 112.

FIG. 3 is a diagram showing an on-chip optical edge filter 126 in the image capturing device 202. As shown in FIG. 3, the on-chip optical edge filter 126 comprises a plurality of longpass filters, including first filters Y for passing light in a long wavelength range over a first wavelength, second filters R for passing light in a wavelength range over a second wavelength, third filters IR1 for passing light in a wavelength range over a third wavelength, and fourth filters IR2 for passing light in a wavelength range over a fourth wavelength. Among the first through fourth wavelengths, the fourth wavelength is the longest, the third and second wavelengths are successively longer, and the first wavelength is the shortest. The on-chip optical edge filter 126 includes a plurality of regions W, which do not filter applied light, but through which the applied light passes.

The first filters Y, the second filters R, the third filters IR1, and the fourth filters IR2 are disposed on the pixels 204 as on-chip filters. Each of the first filters Y, the second filters R, the third filters IR1, and the fourth filters IR2 is combined with one pixel. The pixels 204, which are combined with the first filters Y, the second filters R, and the third filters IR1, and the pixels 204, which are combined with the regions W, have identical areas. Such pixels 204 will be referred to as "first pixels 204a". The pixels 204, which are combined with the fourth filters IR2, are four times greater in area than the first pixels 204a, which are combined with the first filters Y, the second filters R, and the third filters IR1. Such pixels 204 will be referred to as "second pixels 204b". The image capturing device 202 thus has a plurality of first pixels 204a, each having a first area, and a plurality of second pixels 204b, each having a second area. The second pixels 204b are fewer in number than the first pixels 204a. The number of second pixels 204b is determined depending on the ratio of the area of the first pixels 204a to the area of the second pixels 204b.

Figure 4:
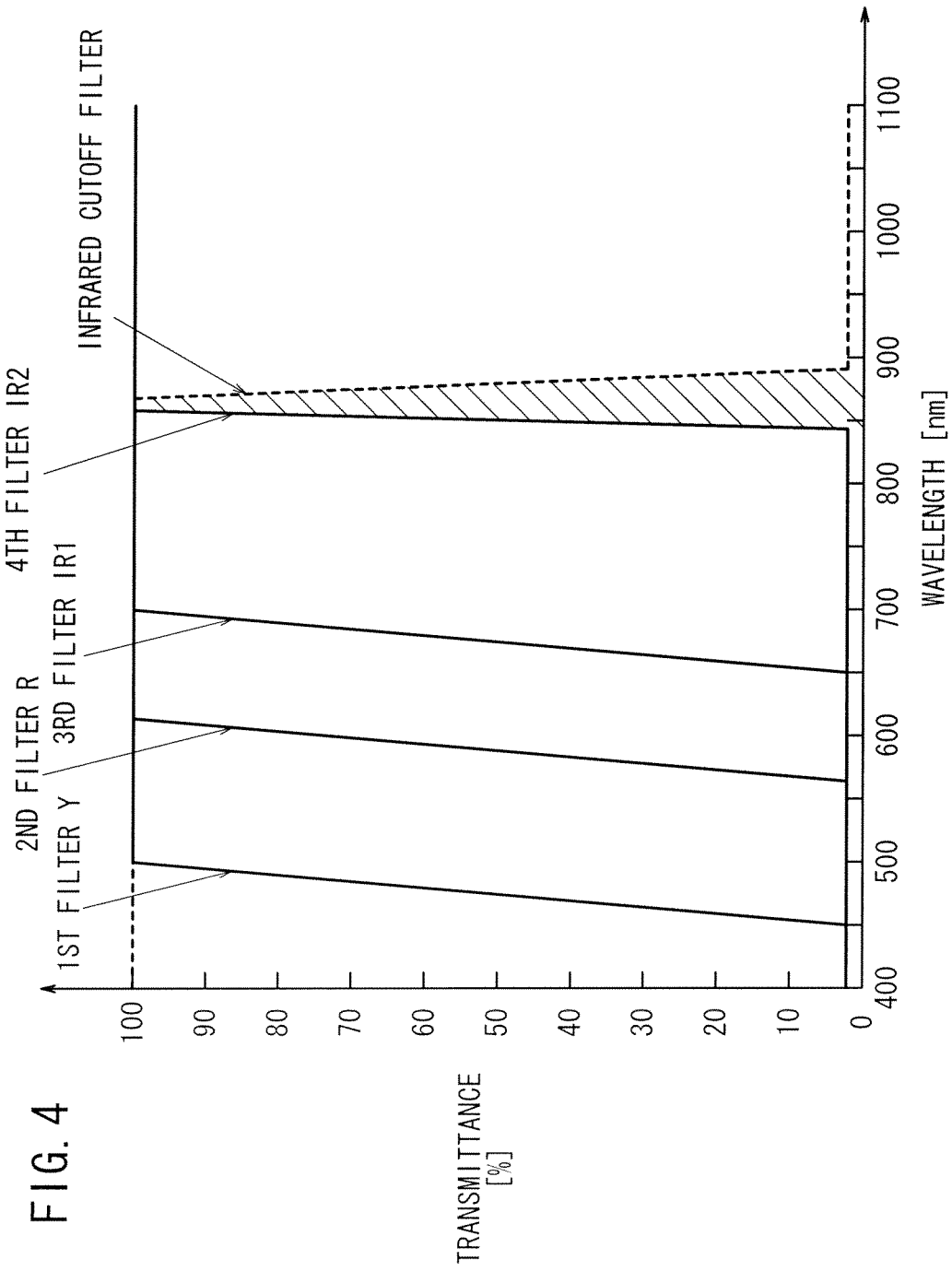
FIG. 4 is a diagram showing filter characteristics of the on-chip optical filter.

FIG. 4 shows filter characteristics of the on-chip optical edge filter 126. The first filters Y have filter characteristics for cutting off (rejecting) light having wavelengths lower than about 450 nm, while passing light having wavelengths higher than 500 nm. Between about 450 nm and 500 nm, the transmittance of the first filters Y increases progressively as the wavelength becomes longer. The first filters Y may have filter characteristics such that the transmittance thereof varies within the range from about 450 nm to about 550 nm, while rejecting light having shorter wavelengths in a range where the transmittance does not vary, and passing light having longer wavelengths in a range where the transmittance does not vary. In other words, the first filters Y have filter characteristics for passing light having wavelengths higher than the first wavelength, which lies between about 450 nm and about 550 nm.

The second filters R have filter characteristics for cutting off (rejecting) light having wavelengths lower than about 570 nm, while passing light having wavelengths higher than about 620 nm. Between about 570 nm and about 620 nm, the transmittance of the second filters R progressively increases as the wavelength becomes longer. The second filters R may have filter characteristics such that the transmittance thereof varies within the range from about 550 nm to 650 nm, rejecting light having shorter wavelengths in a range where the transmittance does not vary, and passing light having longer wavelengths in a range where the transmittance does not vary. In other words, the second filters R have filter characteristics for passing light having wavelengths higher than the second wavelength, which lies between about 550 nm and 650 nm.

The third filters IR1 have filter characteristics for cutting off (rejecting) light having wavelengths lower than about 650 nm, while passing light having wavelengths higher than about 700 nm. Between about 650 nm and about 700 nm, the transmittance of the third filters IR1 progressively increases as the wavelength becomes longer. The third filters IR1 may have filter characteristics such that the transmittance thereof varies within the range from about 600 nm to 750 nm, rejecting light having shorter wavelengths in a range where the transmittance does not vary, and passing light having longer wavelengths in a range where the transmittance does not vary. In other words, the third filters IR1 have filter characteristics for passing light having wavelengths higher than the third wavelength, which lies between about 600 nm and 750 nm.

The fourth filters IR2 have filter characteristics for cutting off (rejecting) light having wavelengths lower than about 840 nm, while passing light having wavelengths higher than about 860 nm. Between about 840 nm and about 860 nm, the transmittance of the fourth filters IR2 progressively increases as the wavelength becomes longer. The fourth filters IR2 may have filter characteristics such that the transmittance thereof varies within the range from about 750 nm to 900 nm, rejecting light having shorter wavelengths in a range where the transmittance does not vary, and passing light having longer wavelengths in a range where the transmittance does not vary. In other words, the fourth filters IR2 have filter characteristics for passing light having wavelengths higher than the fourth wavelength, which lies between about 750 nm and 900 nm.

The first filters Y, the second filters R, the third filters IR1, and the fourth filters RI2 employ filter characteristics in which the first wavelength, the second wavelength, the third wavelength, and the fourth wavelength are related to each other such that the first wavelength<the second wavelength<the third wavelength<the fourth wavelength. Therefore, the first filters Y, the second filters R, the third filters IR1, and the fourth filters RI2 have filter characteristics thereof established so as to satisfy the above wavelength relationship.

The infrared cutoff filter 122 has filter characteristics, which are represented by the dotted-line curve shown in FIG. 4. More specifically, the infrared cutoff filter 122 has filter characteristics for cutting off (rejecting) light having wavelengths higher than about 890 nm, while passing light having wavelengths lower than about 880 nm. Between about 880 nm and about 890 nm, the transmittance of the infrared cutoff filter 122 progressively decreases as the wavelength becomes longer. The infrared cutoff filter 122 is a filter for rejecting light having longer wavelengths, in a range where the transmittance thereof does not vary, while passing light having shorter wavelengths, in a range where the transmittance thereof does not vary. In other words, the infrared cutoff filter 122 has filter characteristics for passing light having wavelengths lower than a fifth wavelength, which lies between about 880 nm and 890 nm. The infrared cutoff filter 122 is arranged as part of the optical system of the light-detecting apparatus 110. Therefore, light that has been transmitted through the infrared cutoff filter 122 is applied to the image capturing device 202.

The applied light passes through the first pixels 204a in the regions W. B (blue) component pixel signals can be produced by subtracting pixel signals of the first pixels 204a, which have detected light transmitted through the first filters Y, from pixel signals of the first pixels 204a in the regions W. G (green) component pixel signals can be produced by subtracting pixel signals of the first pixels 204a, which have detected light transmitted through the second filters R, from pixel signals of the first pixels 204a that have detected light transmitted through the first filters Y. R (red) component pixel signals can be produced by subtracting pixel signals of the first pixels 204a, which have detected light transmitted through the third filters IR1, from pixel signals of the first pixels 204a that have detected light transmitted through the second filters R. Thus, R, G, B values of the pixel signals can be determined by the first filters Y, the second filters R, and the third filters IR1. Even if photoelectric crosstalk is caused by near-infrared wavelengths at the pixels, accurate R, G, B values, which are free of the effects of crosstalk, can be produced, since such values are determined by subtracting respective pixel signals from each other.

Light that passes through the fourth filters IR2 has a wavelength range provided by the fourth filters IR2 and the infrared cutoff filter 122. The second pixels 204b, which detect the light that has passed through the fourth filters IR2, detects infrared light in the shaded area shown in FIG. 4. The fourth filters IR2 and the infrared cutoff filter 122 jointly serve as a filter for passing at least a portion of the infrared radiation emitted from the light-emitting apparatus 102. Reflected light Lr, which is produced when the emitted light Le from the light-emitting apparatus 102 is reflected by the subject W, passes through the fourth filters IR2, and ambient light Ls, which passes through the fourth filters IR2, is reduced. Entry of ambient light Ls further is reduced because the wavelength range of the transmitted light is reduced by the fourth filters IR2 and the infrared cutoff filter 122.

The second pixels 204b, which detect light that has passed through the fourth filters IR2, are capable of accurately detecting reflected light Lr. If ambient light Ls is mixed with reflected light Lr when only reflected light Lr is desired to be detected, then such ambient light Ls is regarded as a noise component. If the ratio of ambient light Ls to reflected light Lr is large, this implies that the noise component is significantly large.

Figure 5:
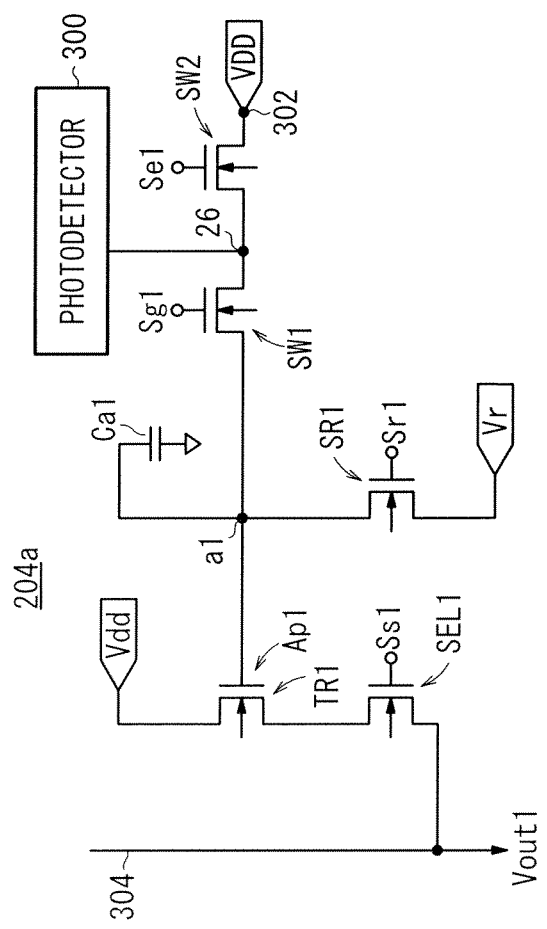
FIG. 5 is a circuit diagram of a circuit arrangement for a first pixel.

The pixels 204 will be described in detail below. FIG. 5 shows a circuit of each of the first pixels 204a. As shown in FIG. 5, the first pixel 204a comprises a photodetector 300, a photoelectron storage 26, a first capacitor Ca1, a photoelectron discharger 302, a first switching element SW1, a second switching element SW2, a first resetting switch SR1, and a first amplifier AP1.

The first switching element SW1, which comprises an n-channel MOS transistor, for example, has a source, which is connected to the photoelectron storage 26, a drain, which is connected to the first capacitor Ca1, and a gate, which is connected to the gate drive circuit 206 (see FIG. 2). The gate drive circuit 206 supplies a gate signal (reading signal Sg1) to the gate of the first switching element SW1 in order to selectively turn on and off the first switching element SW1, for thereby transferring photoelectron stored in the photoelectron storage 26 to the first capacitor Ca1.

The second switching element SW2, which comprises an n-channel MOS transistor, for example, has a source, which is connected to the photoelectron storage 26, a drain, which is connected to the photoelectron discharger 302 that is supplied with a positive power supply voltage Vdd from the first power supply 116 (see FIG. 2), and a gate, which is connected to the gate drive circuit 206. The gate drive circuit 206 supplies a gate drive signal (photoelectron discharging signal Set) to the gate of the second switching element SW2, i.e., applies a high-level voltage to the gate of the second switching element SW2, in order to turn on the second switching element SW2, for thereby discharging the photoelectron stored in the photoelectron storage 26 via the photoelectron discharger 302, and without transferring photoelectron to the first capacitor Ca1.

The first resetting switch SR1, which comprises an n-channel MOS transistor, for example, has a source, which is connected to a junction a1 between the first switching element SW1 and the first capacitor Ca1, a drain, which is supplied with the resetting voltage Vr from the second power supply 118 (see FIG. 2), and a gate, which is connected to the gate drive circuit 206. The gate drive circuit 206 supplies a gate drive signal (resetting signal Sr1) to the gate of the first resetting switch SR1 in order to turn the first resetting switch SR1 on, for thereby applying a given setting voltage to the first capacitor Ca1, i.e., for resetting the first capacitor Ca1.

The first amplifier AP1 has a first output element TR1, which comprises an n-channel MOS transistor, for example, and a first output switch SEL1, which comprises an n-channel MOS transistor, for example, connected between the source of the first output element TR1 and an output line 304. The first output element TR1 has a gate, which is connected to the junction a1 between the first switching element SW1 and the first capacitor Ca1, and a drain, which is supplied with the positive power supply voltage Vdd from the first power supply 116. The source of the first output element TR1 is connected to the drain of the first output switch SEM. The first output switch SEL1 has a gate, which is connected to the gate drive circuit 206, and a source, which is connected to the output line 304.

The gate drive circuit 206 outputs a gate drive signal (output selection signal Ss1) to the gate of the first output switch SEL1 in order to turn on the first output switch SEM. When the first output switch SEL1 is turned on, a voltage that depends on the amount of photoelectron stored in the first capacitor Ca1 is amplified by the first output element TR1, and then is output as a first output voltage Vout1 on the output line 304.

Figure 6:
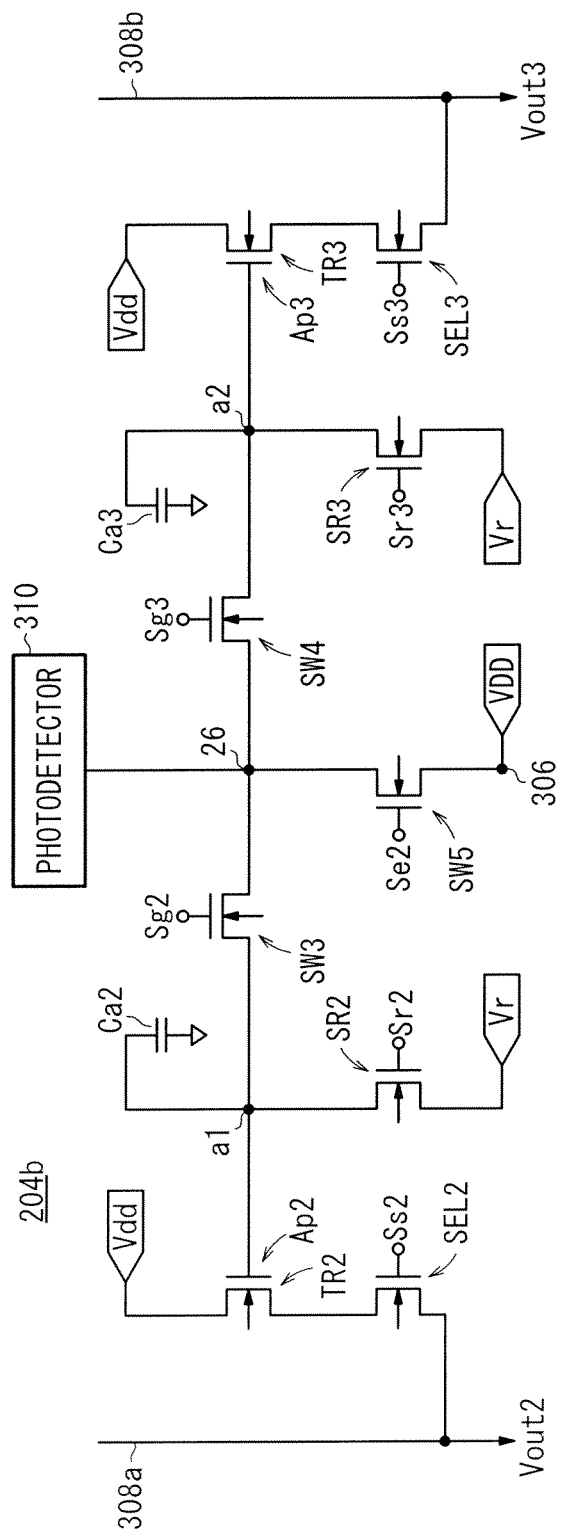
FIG. 6 is a circuit diagram of a circuit arrangement for a second pixel.

FIG. 6 shows a circuit of each of the second pixels 204b. As shown in FIG. 6, the second pixel 204b comprises a photodetector 310, a photoelectron storage 26, a second capacitor Ca2, a third capacitor Ca3, a photoelectron discharger 306, a third switching element SW3, a fourth switching element SW4, a fifth switching element SW5, a second resetting switch SR2, a third resetting switch SR3, a second amplifier AP2, and a third amplifier AP3.

The third switching element SW3, which comprises an n-channel MOS transistor, for example, has a source, which is connected to the photoelectron storage 26, a drain, which is connected to the second capacitor Ca2, and a gate, which is connected to the gate drive circuit 206 (see FIG. 2). The gate drive circuit 206 supplies a gate signal (reading signal Sg2) to the gate of the third switching element SW3 in order to selectively turn on and off the third switching element SW3, for thereby transferring the photoelectron stored in the photoelectron storage 26 to the second capacitor Ca2.

The fourth switching element SW4, which comprises an n-channel MOS transistor, for example, has a source, which is connected to the photoelectron storage 26, a drain, which is connected to the third capacitor Ca3, and a gate, which is connected to the gate drive circuit 206. The gate drive circuit 206 supplies a gate drive signal (reading signal Sg3) to the gate of the fourth switching element SW4 in order to control turning on and off of the fourth switching element SW4, for thereby transferring the photoelectron stored in the photoelectron storage 26 to the third capacitor Ca3.

The fifth switching element SW5, which comprises an n-channel MOS transistor, for example, has a source, which is connected to the photoelectron storage 26, a drain, which is connected to the photoelectron discharger 306 that is supplied with the positive power supply voltage Vdd from the first power supply 116 (see FIG. 2), and a gate, which is connected to the gate drive circuit 206. The gate drive circuit 206 supplies a gate drive signal (photoelectron discharging signal Se2) to the gate of the fifth switching element SW5 in order to turn on the fifth switching element SW5, for thereby discharging the photoelectron stored in the photoelectron storage 26 via the photoelectron discharger 306, and without transferring photoelectrons to the second capacitor Ca2 and the third capacitor Ca3.

The second resetting switch SR2 and the third resetting switch SR3 each comprise an n-channel MOS transistor, for example. The second resetting switch SR2 has a source, which is connected to a junction a1 between the third switching element SW3 and the second capacitor Ca2. The third resetting switch SR3 has a source, which is connected to a junction a2 between the fourth switching element SW4 and the third capacitor Ca3. The second resetting switch SR2 and the third resetting switch SR3 have respective drains, which are supplied with the resetting voltage Vr from the second power supply 118 (not shown in FIG. 6), and respective gates, which are connected to the gate drive circuit 206. The gate drive circuit 206 supplies gate drive signals (second resetting signal Sr2 and third resetting signal Sr3) respectively to the gates of the second resetting switch SR2 and the third resetting switch SR3, so as to selectively or simultaneously turn on the second resetting switch SR2 and the third resetting switch SR3, for thereby applying certain setting voltages respectively to the second resetting switch SR2 and the third resetting switch SR3.

The second amplifier AP2 has a second output element TR2, which comprises an n-channel MOS transistor, for example, and a second output switch SEL2, which comprises an n-channel MOS transistor, for example, connected between the source of the second output element TR2 and a first output line 308a. The second output element TR2 has a gate, which is connected to the junction a1 between the third switching element SW3 and the second capacitor Ca2, and a drain, which is supplied with the positive power supply voltage Vdd from the first power supply 116. The source of the second output element TR2 is connected to the drain of the second output switch SEL2.

The second output switch SEL2 has a gate, which is connected to the gate drive circuit 206, and a source, which is connected to the first output line 308a. The gate drive circuit 206 supplies a gate drive signal (output selection signal Ss2) to the gate of the second output switch SEL2 in order to turn on the second output switch SEL2. When the second output switch SEL2 is turned on, the second output switch SEL2 allows a voltage that depends on the amount of photoelectron stored in the second capacitor Ca2 to be amplified by the second output element TR2, and then output as a second output voltage Vout2 on the first output line 308a.

The third amplifier AP3 has a third output element TR3, which comprises an n-channel MOS transistor, for example, and a third output switch SEL3, which comprises an n-channel MOS transistor, for example, connected between the source of the third output element TR3 and a second output line 308b. The third output element TR3 has a gate, which is connected to the junction a2 between the fourth switching element SW4 and the third capacitor Ca3, and a drain, which is supplied with the positive power supply voltage Vdd from the first power supply 116. The source of the third output element TR3 is connected to the drain of the third output switch SEL3.

The third output switch SEL3 has a gate, which is connected to the gate drive circuit 206, and a source, which is connected to the second output line 308b. The gate drive circuit 206 supplies a gate drive signal (output selection signal Ss3) to the gate of the third output switch SEL3 in order to turn on the third output switch SEL3. When the third output switch SEL3 is turned on, the third output switch SEL3 allows a voltage that depends on the amount of photoelectron stored in the third capacitor Ca3 to be amplified by the third output element TR3, and then output as a third output voltage Vout3 on the second output line 308b.

Figure 7:
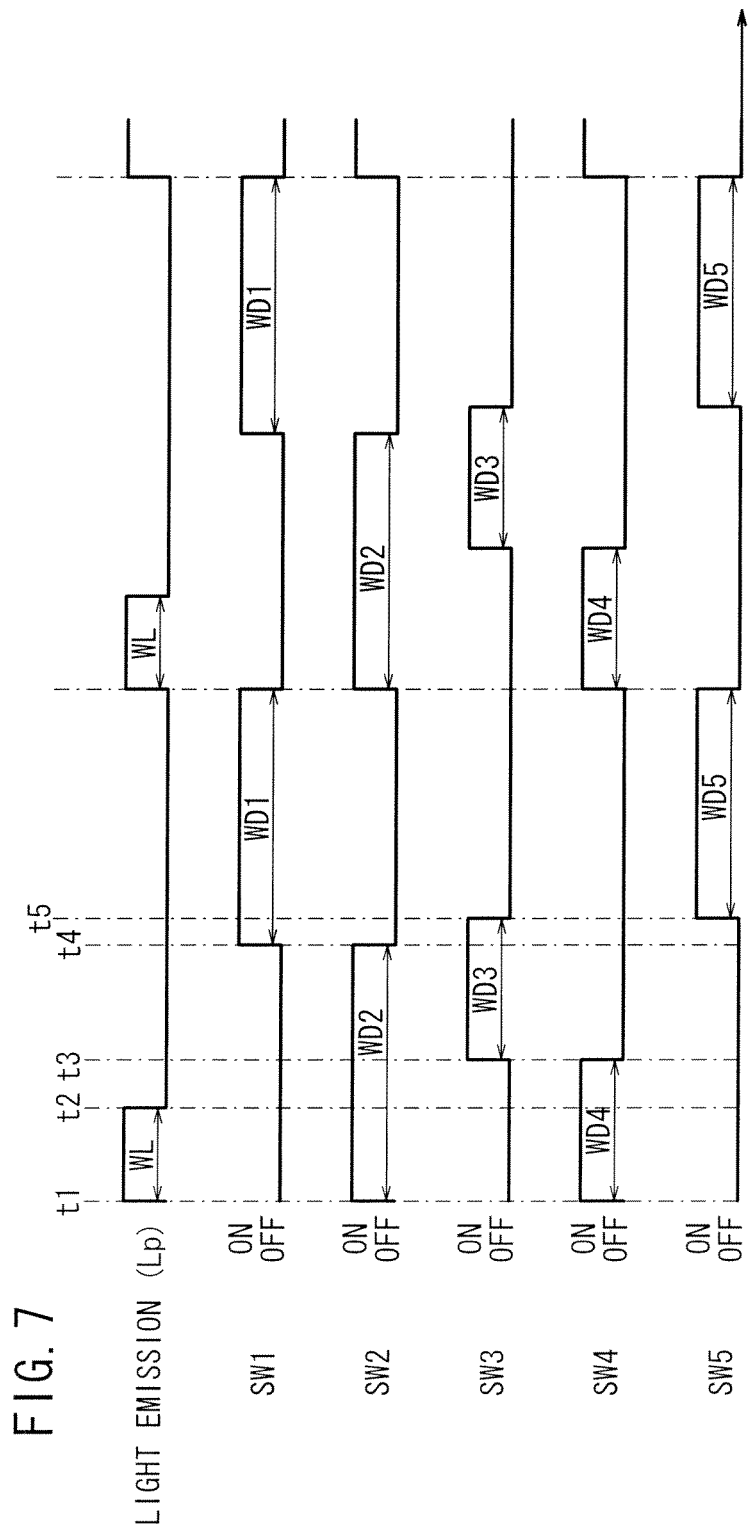
FIG. 7 is a timing chart showing an operation sequence of the image capturing system.

Operations of the image capturing system 100 will be described below with reference to FIG. 7. In FIG. 7, the light-emitting apparatus 102 emits pulsed light Lp for an emission period WL. The first switching element SW1 and the second switching element SW2 are turned on for respective periods WD1, WD2. The third switching element SW3, the fourth switching element SW4, and the fifth switching element SW5 are turned on for respective periods WD3, WD4, WD5. The period WD1 also represents an exposure period for the first pixels 204a, and the periods WD3, WD4 also represent an exposure period for the second pixels 204b.

In each periodic cycle, the controller 114 of the image capturing system 100 controls the light-emitting apparatus 102 so as to emit pulsed light Lp for the emission period WL. The pulsed light Lp (emitted light Le) emitted from the light-emitting apparatus 102 is reflected and applied as reflected light Lr to the light-detecting apparatus 110. Light applied to and detected by the light-detecting apparatus 110 photoelectrically converted into electric signals by the photodetector 310.

First, the image capturing system 100 is initialized by turning on the second switching element SW2 and the first resetting switch SR1, while turning off the first switching element SW1 and the first output switch SEL1, and also by turning on the fifth switching element SW5, the second resetting switch SR2, and the third resetting switch SR3, while turning off the third switching element SW3, the fourth switching element SW4, the second output switch SEL2, and the third output switch SEL3. When the image capturing system 100 is initialized in this manner, unwanted photoelectrons stored in the photoelectron storages 26 of the first pixels 204a and the second pixels 204b are discharged through the photoelectron dischargers 302, and the capacitors Ca1, Ca2, Ca3 are set respectively to the resetting voltage Vr. Thereafter, the first resetting switch SR1, the second resetting switch SR2, and the third resetting switch SR3 are turned off.

After the image capturing system 100 has been initialized, a cycle for acquiring the reflected light intensity is performed once, or is repeated a plurality of times. Herein, it shall be assumed that such cycles are carried out repeatedly a plurality of times.

In the first cycle, the controller 114 controls the light-emitting apparatus 102 so as to emit pulsed light Lp for the emission period t1 from time t1 to time t2. The first switching element SW1 is turned off at time t1 and remains de-energized for the period WD2 beyond times t2, t3 and until reaching time t4. The second switching element SW2 is turned on at time t1 and remains energized for the period WD2 beyond times t2, t3 and until reaching time t4. The period WD2 may be longer than the period during which the image capturing device 202 detects reflected light Lr produced when the pulsed light Lp emitted from the light-emitting apparatus 102 is reflected by the subject W. The photodetector 300 of the first pixel 204a detects reflected light Lr and photoelectrically generates a photoelectron with the detected reflected light Lr, which is stored in the photoelectron storage 26. The photoelectron that is stored in the photoelectron storage 26 then is transferred through the second switching element SW2 to the photoelectron discharger 302, which discharges the photoelectron. In other words, light applied to the lens 120, i.e., light transmitted through the first filters Y, light transmitted through the second filters R, and light transmitted through the third filters IR are detected by the first pixels 204a, and then the pixel values (photoelectrons) generated by the first pixels 204a are discarded.

At time t4, the first switching element SW1 is turned on and the second switching element SW2 is turned off, and the first and second switching elements SW1, SW2 remain energized and de-energized, respectively, for the period WD1 until the next cycle starts. Alternatively, the first switching element SW1 may not remain energized until the next cycle starts, but the period WD1 may be made shorter. A photoelectron representative of ambient light Ls, which is stored in the first pixel 204a during the period WD1, is transferred through the first switching element SW1 to the first capacitor Ca1.

Upon completion of a certain number of cycles, the first output switch SEL1 is turned on in order to allow a voltage that depends on the amount of photoelectron stored in the first capacitor Ca1 to be amplified by the first output element TR1, and then output as a first output voltage Vout1 on the output line 304. The first output voltage Vout1 is converted by the A/D converter 216 into a digital pixel signal, which is output to the processor 112. The word "exposure," as used herein, implies detecting light, generating a photoelectron for use as a pixel signal with the detected light, but does not imply detecting light and generating a photoelectron with the detected light that then is discharged.

The processor 112 calculates pixel signals of R, G and B components from pixel signals that are output from the first pixels 204a in the regions W, from pixel signals that are output from the first pixels 204a, which detect light transmitted through the first filters Y, from pixel signals that are output from the first pixels 204a, which detect light transmitted through the second filters R, and from pixel signals that are output from the first pixels 204a, which detect light transmitted through the third filters IR1. More specifically, the blue-component calculator 130 calculates blue-component pixel signals by subtracting the pixel signals output from the first pixels 204a, which detect light transmitted through the first filters Y, from the pixel signals output from the first pixels 204a in the regions W. The green-component calculator 132 calculates green-component pixel signals by subtracting the pixel signals output from the first pixels 204a, which detect light transmitted through the second filters R, from the pixel signals output from the first pixels 204a, which detect light transmitted through the first filters Y. The red-component calculator 134 calculates red-component pixel signals by subtracting the pixel signals output from the first pixels 204a, which detect light transmitted through the third filters IR1, from the pixel signals output from the first pixels 204a, which detect light transmitted through the second filters R. The calculated pixel signals of R, G and B components represent only the detected ambient light Ls, which does not include the reflected signal Lr from the subject W.

As described above, photoelectrons (electric charges) generated by the first pixels 204a are not stored during the period in which the reflected signal Lr from the subject W is applied to the image capturing device 202, but rather, are stored during the period in which the reflected signal Lr from the subject W is not applied to the image capturing device 202. Consequently, photoelectrons generated by the first pixels 204a during the period in which the reflected signal Lr from the subject W is applied to the image capturing device 202 are not added to the photoelectrons generated by the first pixels 204a during the period in which ambient light Ls is applied to the image capturing device 202, thereby preventing the first pixels 204a from becoming saturated, and hence preventing the dynamic range of the image capturing device 202 from being unduly lowered.

Even if photoelectrons generated by the first pixels 204a during the period in which the reflected signal Lr from the subject W is applied to the image capturing device 202 are added, it is still possible to calculate pixel signals representative of the ambient light Ls, since the pixel signals of R, G and B components are calculated according to a subtractive process. However, when photoelectrons generated by the first pixels 204a during the period in which the reflected signal Lr from the subject W is applied to the image capturing device 202 are added, if the emitted light Le from the light-emitting apparatus 102 is strong in intensity, the first pixels 204a may become saturated and result in photoelectron overflow. Hence, the first pixels 204a may fail to produce accurate pixel signals. According to the present invention, therefore, photoelectrons generated by the first pixels 204a are discarded during the period in which the reflected signal Lr from the subject W is applied to the image capturing device 202, whereas photoelectrons generated by the first pixels 204a representing ambient line Ls are stored during the period in which the reflected signal Lr from the subject W is not applied to the image capturing device 202. Consequently, the first pixels 204a can produce accurate pixel signals representing an ambient line Ls.

For the period WD4 from time t1 to time t3, the third switching element SW3 remains de-energized, while the fourth switching element SW4 remains energized. Photoelectrons, which are stored in the second pixels 204b during the period WD4, are transferred through the fourth switching element SW4 to the third capacitor Ca3. The period WD4 should preferably be equal to or longer than the period during which the image capturing device 202 detects reflected light Lr produced when pulsed light Lp emitted from the light-emitting apparatus 102 is reflected by the subject W.

At time t3, the fourth switching element SW4 is turned off, while the third switching element SW3 is turned on. The third switching element SW3 remains energized for the period WD3 from time t3 to time t5. Photoelectrons, which are stored in the second pixels 204b and represent ambient light Ls during the period WD3, are transferred through the third switching element SW3 to the second capacitor Ca2. The period WD3 is of the same duration as the period WD4.

At time t5, the third switching element SW3 is turned off, while the fifth switching element SW5 is turned on. The fifth switching element SW5 remains energized for a period WD5 from time t5 until starting of the next cycle. During period WD5, the third switching element SW3 and the fourth switching element SW4 remain de-energized. Unwanted photoelectrons, which are stored in the second pixels 204b during the period WD5, are transferred through the fifth switching element SW5 to the photoelectron discharger 306, which discharges the photoelectrons.

Upon completion of a given number of cycles, the second output switch SEL2 is turned on, thereby allowing a voltage that depends on the amount of photoelectron stored in the second capacitor Ca2 to be amplified by the second output element TR2, and then output as a second output voltage Vout2 on the first output line 308a. The third output switch SEL3 also is turned on, thereby allowing a voltage that depends on the amount of photoelectron stored in the third capacitor Ca3 to be amplified by the third output element TR3, and then output as a third output voltage Vout3 on the second output line 308b.

The second output voltage Vout2, which is output on the first output line 308a, and the third output voltage Vout3, which is output on the second output line 308b, are converted by the A/D converter 216 into a first digital pixel signal D1 and a second digital pixel signal D2, respectively. The first digital pixel signal D1 and the second digital pixel signal D2 are output respectively to the processor 112.

The processor 112 subtracts the first digital pixel signal D1 from the second digital pixel signal D2, thereby generating reflected-light-intensity pixel data Dr. More specifically, the processor 112 subtracts the first digital pixel signal D1 of one pixel from the second digital pixel signal D2 of the same pixel.

The light-emitting apparatus 102 emits pulsed light Lp for a pulse duration, which is longer than 1 nanosecond and shorter than 0.25 second. Therefore, the pulse duration of pulsed light Lp can be set to a time length that is equal to or shorter than 1% of one frame period, e.g., 0.1% of one frame period. Since the pulse duration can be significantly reduced, the power of one light pulse Lp can be increased, thus making it possible to increase the S/N ratio of reflected light Lr (signal light) with respect to ambient light Ls. The period WD4 can also be reduced depending on a pulse duration of the pulsed light Lp. Further, it is possible to reduce only the period WD3 for reading ambient light Lp, e.g., to equalize the period WD3 to the period WD4. Consequently, the amount of ambient light Ls applied to the image capturing device 202 can be reduced, thereby reducing optical shot noise caused by such ambient light Ls.

Inasmuch as the time period between the period WD3 and the period WD4 can be reduced almost to zero, it is possible to switch quickly between reading of photoelectrons during the period WD3 in which pulsed light Lp is not applied to the subject W (acquisition of luminance values at a time when pulsed light Lp is not emitted) and reading of photoelectrons during the period WD4 in which pulsed light Lp is applied to the subject W (acquisition of luminance values at a time when pulsed light Lp is emitted). Accordingly, the acquisition of luminance values at a time when pulsed light Lp is not emitted and the acquisition of luminance values at a time when pulsed light Lp is emitted are highly synchronized.

When the above cycles are carried out repeatedly, the amount of photoelectron stored in each of the third capacitor Ca3 and the fourth capacitor Ca4 is increased. Since the duty cycle of pulsed light Lp with respect to the cyclic period of the array of light pulses is set to less than 1(%), e.g., less than 0.1(%), the power of each of the light pulses of the array can be made higher than the power of continuous light, and it is possible to greatly increase the S/N ratio of reflected light Lr (signal light component) with respect to ambient light Ls (noise component) during each pulse duration. In addition, inasmuch as photoelectrons are stored in the third capacitor Ca3 and the fourth capacitor Ca4 over a plurality of cycles, the signal light component can be increased in order to increase subsequent signal processing accuracy. Moreover, as it is possible to switch quickly between reading of photoelectrons during the period WD3 and reading of photoelectrons during the period WD4, the acquisition of luminance values during times when pulsed light Lp is not emitted and the acquisition of luminance values during times when pulsed light Lp is emitted are highly synchronized.

According to the above embodiment, as described above, it is possible to obtain luminance information of R, G, B values of ambient light, as well as luminance information of reflected light Lr, which is not affected by ambient light.

Figure 8:
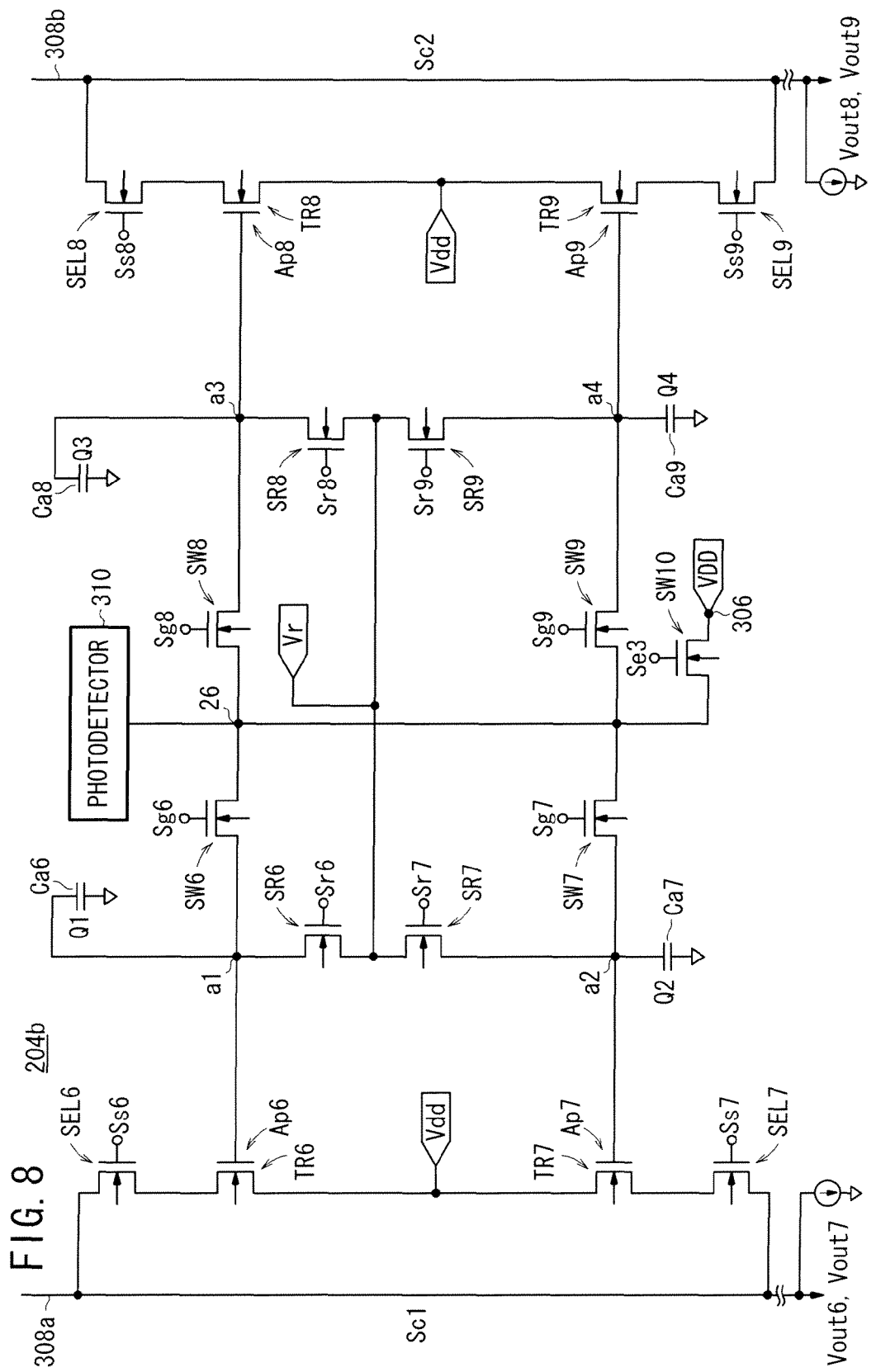
FIG. 8 is a circuit diagram of another circuit arrangement for the second pixel.

FIG. 8 is a circuit diagram of another circuit arrangement for the second pixel 204b. The circuit arrangement for the second pixel 204b, as shown in FIG. 8, is capable of performing a range finding process for measuring the distance to the subject W. As shown in FIG. 8, the second pixel 204b comprises a photodetector 310, a photoelectron storage 26, sixth through ninth capacitors Ca6 through Ca9, a photoelectron discharger 306, sixth through ninth resetting switches SR6 through SR9, and sixth through ninth amplifiers AP6 through AP9. In FIG. 8, for illustrative purposes, the photoelectron storage 26 is illustrated as two junctions, but actually, the photoelectron storage 26 comprises a single photoelectron storage. The sixth capacitor Ca6 and the eighth capacitor Ca8 are axially symmetric with respect to the center of the photoelectron storage 26. Similarly, the seventh capacitor Ca7 and the ninth capacitor Ca9 also are axially symmetric with respect to the center of the photoelectron storage 26. Likewise, the sixth capacitor Ca6 and the seventh capacitor Ca7 are axially symmetric with respect to the center of the photoelectron storage 26, and the eighth capacitor Ca8 and the ninth capacitor Ca9 also are axially symmetric with respect to the center of the photoelectron storage 26.

The sixth switching element SW6 and the sixth capacitor Ca6 are identical to the third switching element SW3 and the second capacitor Ca2, respectively, of the second pixel 204b shown in FIG. 6, and such features will not be described in detail below. Similarly, the seventh switching element SW7 and the seventh capacitor Ca7 are identical to the fourth switching element SW4 and the third capacitor Ca3, respectively, of the second pixel 204b shown in FIG. 6, and such features will not be described in detail below.

The eighth switching element SW8, which comprises an n-channel MOS transistor, for example, has a source, which is connected to the photoelectron storage 26, a drain, which is connected to the eighth capacitor Ca8, and a gate, which is connected to the gate drive circuit 206 (see FIG. 2). The gate drive circuit 206 supplies a gate drive signal (reading signal Sg8) to the gate of the eighth switching element SW8 in order to control turning on and off of the eighth switching element SW8, for thereby transferring a photoelectron stored in the photoelectron storage 26 to the eighth capacitor Ca8.

The ninth switching element SW9, which comprises an n-channel MOS transistor, for example, has a source, which is connected to the photoelectron storage 26, a drain, which is connected to the ninth capacitor Ca9, and a gate, which is connected to the gate drive circuit 206. The gate drive circuit 206 supplies a gate drive signal (reading signal Sg9) to the gate of the ninth switching element SW9 in order to control turning on and off of the ninth switching element SW9, for thereby transferring a photoelectron stored in the photoelectron storage 26 to the ninth capacitor Ca9.

The tenth switching element SW10, which comprises an n-channel MOS transistor, for example, has a source, which is connected to the photoelectron storage 26, a drain, which is connected to the photoelectron discharger 306 that is supplied with the positive power supply voltage Vdd from the first power supply 116 (see FIG. 2), and a gate, which is supplied with a photoelectron discharging signal Se3 from the gate drive circuit 206.

The gate drive circuit 206 supplies a photoelectron discharging signal Se3 to the gate of the tenth switching element SW10, i.e., applies a high-level voltage to the gate of the tenth switching element SW10, in order to turn on the tenth switching element SW10, for thereby discharging unwanted photoelectrons stored in the photoelectron storage 26 via the photoelectron discharger 306, without transferring such photoelectrons to the sixth through ninth capacitors Ca6 through Ca9.

More specifically, while all of the sixth through ninth switching elements SW6 through SW9 are de-energized, when the gate drive circuit 206 supplies a photoelectron discharging signal Se3 to the gate of the tenth switching element SW10, i.e., applies a high-level voltage to the gate of the tenth switching element SW10, the tenth switching element SW10 is turned on, thereby discharging unwanted photoelectrons generated by the photodetector 310 to the photoelectron discharger 306, without sending such unwanted photoelectrons to the sixth through ninth capacitors Ca6 through Ca9. Therefore, it is possible for the sixth through ninth capacitors Ca6 through Ca9 to be supplied only with photoelectrons that are generated by the photodetector 310 while the sixth through ninth switching elements SW6 through SW9 are energized. As a result, the distance z to the subject W can be measured according to a range finding process, which shall be described later.

The sixth through ninth resetting switches SR6 through SR9, each comprise an n-channel MOS transistor, for example. The six resetting switch SR6 each include a source, which is connected to a junction a1 between the sixth switching element SW6 and the sixth capacitor Ca6. The seventh resetting switch SR7 has a source, which is connected to a junction a2 between the seventh switching element SW7 and the seventh capacitor Ca7. The eighth resetting switch SR8 has a source, which is connected to a junction a3 between the eighth switching element SW8 and the eighth capacitor Ca8. The ninth resetting switch SR9 has a source, which is connected to a junction a4 between the ninth switching element SW9 and the ninth capacitor Ca9. The sixth through ninth resetting switches SR6 through SR9 have respective drains, which are supplied respectively with the resetting voltage Vr from the second power supply 118 (see FIG. 2), and respective gates, which are connected to the gate drive circuit 206.

The gate drive circuit 206 supplies gate drive signals (sixth through ninth resetting signals Sr6 through Sr9) to the gates of the sixth through ninth resetting switches SR6 through SR9, in order to selectively or simultaneously turn on the sixth through ninth resetting switches SR6 through SR9, for thereby applying certain respective setting voltages to the sixth through ninth resetting switches SR6 through SR9, i.e., thereby resetting the sixth through ninth resetting switches SR6 through SR9.

The sixth and seventh amplifiers AP6, AP7 are identical to the second and third amplifiers AP2, AP3 of the second pixel 204b shown in FIG. 6, and will not be described in detail. The sixth amplifier AP6 includes a sixth output element TR6, and a sixth output switch SEL6. The sixth output switch SEL6 has a source, which is connected to the first output line 38a, and a gate, which is supplied with a sixth output selection signal Ss6 from the vertical selection circuit 208 (see FIG. 2). Similarly, the seventh amplifier AP7 includes a seventh output element TR7, and a seventh output switch SEL7. The seventh output switch SEL7 has a source, which is connected to the first output line 38a, and a gate, which is supplied with a seventh output selection signal Ss7 from the vertical selection circuit 208.

When the sixth output selection signal Ss6 is applied to the gate of the sixth output switch SEL6, the sixth output switch SEL6 is turned on, thereby allowing a voltage that depends on the amount Q1 of photoelectron stored in the sixth capacitor Ca6 to be amplified by the sixth output element TR6, and then output as a sixth output voltage Vout6 on the first output line 308a. Similarly, when the seventh output selection signal Ss7 is applied to the gate of the seventh output switch SEL7, the seventh output switch SEL7 is turned on, thereby allowing a voltage that depends on the amount Q2 of photoelectron stored in the seventh capacitor Ca7 to be amplified by the seventh output element TR7, and then output as a seventh output voltage Vout7 on the first output line 308a.

The eighth amplifier AP8 has an eighth output element TR8, which comprises an n-channel MOS transistor, for example, and an eighth output switch SEL8, which comprises an n-channel MOS transistor, for example, connected between the source of the eighth output element TR8 and the second output line 308b. The eighth output element TR8 has a gate, which is connected to a junction a8 between the eighth switching element SW8 and the eighth capacitor Ca8, a drain, which is supplied with the positive power supply voltage Vdd from the first power supply 116 (see FIG. 2), and a source, which is connected to the drain of the eighth output switch SEL8. The eighth output switch SEL8 has a source, which is connected to the second output line 308b, and a gate, which is supplied with an eighth output selection signal Ss8 from the vertical selection circuit 208.

When the eighth output selection signal Ss8 is applied to the gate of the eighth output switch SEL8, the eighth output switch SEL8 is turned on, thereby allowing a voltage that depends on the amount Q3 of photoelectron stored in the eighth capacitor Ca8 to be amplified by the eighth output element TR8, and then output as an eighth output voltage Vout8 on the second output line 308b.

The ninth amplifier AP9 comprises a ninth output element TR9, including an n-channel MOS transistor, for example, and a ninth output switch SEL9, including an n-channel MOS transistor, for example, which is connected between the source of the ninth output element TR9 and the second output line 308b. The ninth output element TR9 has a gate, which is connected to a junction a9 between the ninth switching element SW9 and the ninth capacitor Ca9, a drain, which is supplied with the positive power supply voltage Vdd from the first power supply 116, and a source, which is connected to the drain of the ninth output switch SEL9. The ninth output switch SEL9 has a source, which is connected to the second output line 308b, and a gate, which is supplied with a ninth output selection signal Ss9 from the vertical selection circuit 208.

When the ninth output selection signal Ss9 is applied to the gate of the ninth output switch SEL9, the ninth output switch SEL9 is turned on, thereby allowing a voltage that depends on the amount Q4 of photoelectron stored in the ninth capacitor Ca9 to be amplified by the ninth output element TR9, and then output as a ninth output voltage Vout9 on the second output line 308b.

A range finding process, for measuring the distance z from the image capturing system 100 to the subject W, will be described below.

Figure 9:
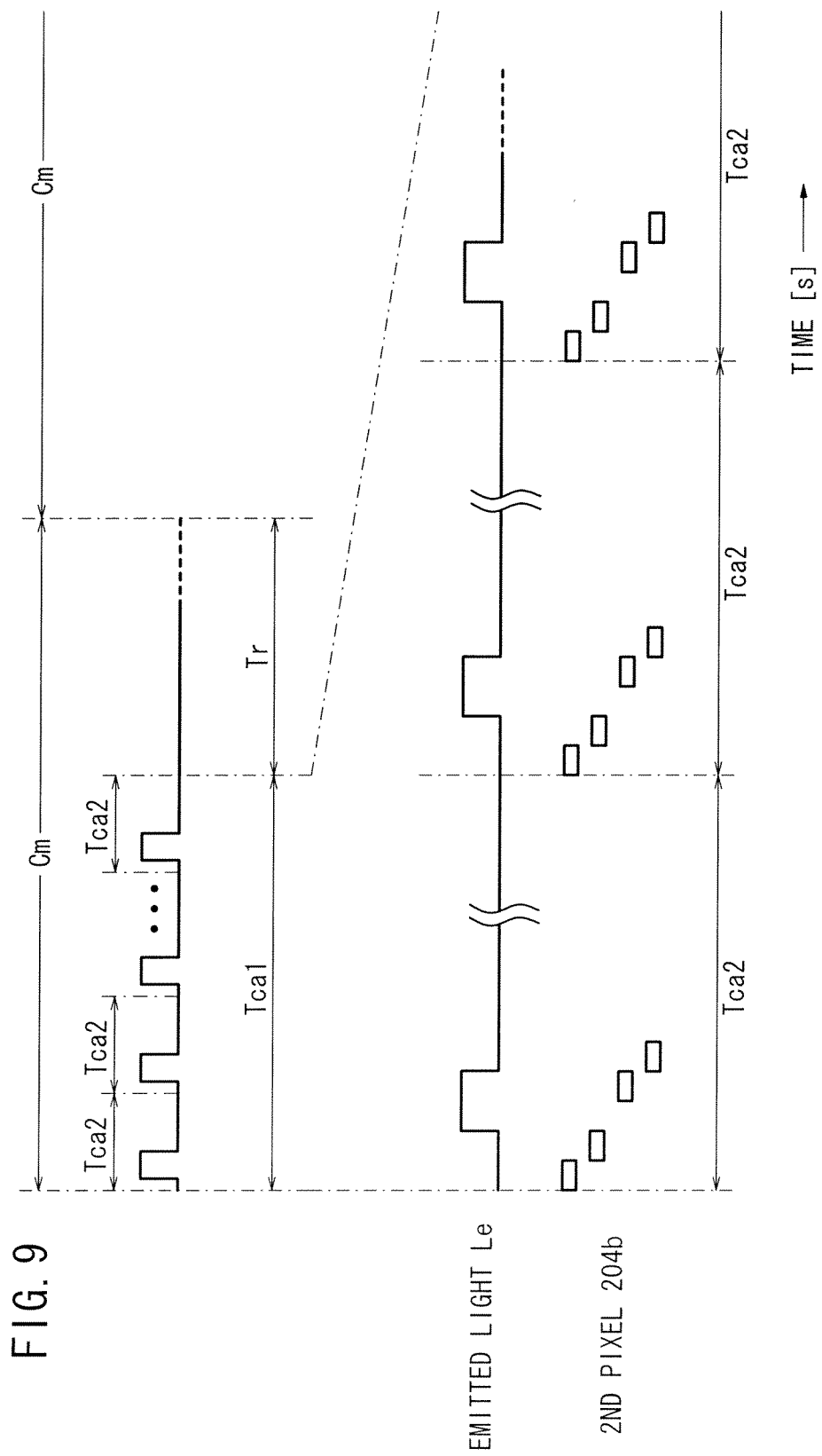
FIG. 9 is a timing chart of a range finding cycle.

(1) Cycle Cm:

As shown in FIG. 9, for the second pixel 204b of the image capturing system 100, each cycle Cm (a cyclic period for determining a measured value) (cycles/s) comprises a first storage period Tca1 for accumulatively storing photoelectrons in the sixth through ninth capacitors Ca6 through Ca9, and a readout period Tr for reading the photoelectrons that have been accumulatively stored in the sixth through ninth capacitors Ca6 through Ca9. The first storage period Tca1 comprises a plurality of second storage periods Tca2 each of which carries out a process (photoelectron storing process) in which pulsed light Lp is applied to the second pixel 204b, and photoelectrons are stored in the sixth through ninth capacitors Ca6 through Ca9. Each of the first storage period Tca1 and the readout period Tr has a duration of 10 milliseconds. Each of the second storage periods Tca2 has a duration of 100 microseconds. In each of the second storage periods Tca2, pulsed light Lp is emitted for a pulse duration of 100 nanoseconds. In each of the second storage periods Tca2, therefore, the light emitter 140 has a duty cycle of 0.1(%).

The image capturing system 100 is capable of outputting a three-dimensional image based on the measured distance to the subject W. Therefore, each cycle Cm can be defined as a frame rate (frames/s) of the three-dimensional image.

The image capturing system 100 carries out one hundred photoelectron storing processes in the first storage period Tca1, and measures a back-and-forth travel period $\Delta P$, i.e., a period during which pulsed light Lp emitted from the light-emitting apparatus 102 hits the subject W and then returns to the light-emitting apparatus 102, as well as the distance z to the subject W, based on the amounts Q1 through Q4 of photoelectron that are stored respectively in the sixth through ninth capacitors Ca6 through Ca9.

(2) Summary of the Measurement Process (During One Second Storage Period Tca2):

The image capturing system 100 measures the back-and-forth travel period $\Delta P$ and the distance z based on the amounts Q1 through Q4 of photoelectron that are stored respectively in the sixth through ninth capacitors Ca6 through Ca9 during the first storage period Tca1. To facilitate understanding of the present invention, a process of determining the back-and-forth travel period $\Delta P$ and the distance z based on the amounts of Q1 through Q4 of photoelectron that are stored respectively in the sixth through ninth capacitors Ca6 through Ca9 during one second storage period Tca2 will be described below.

Figure 10:
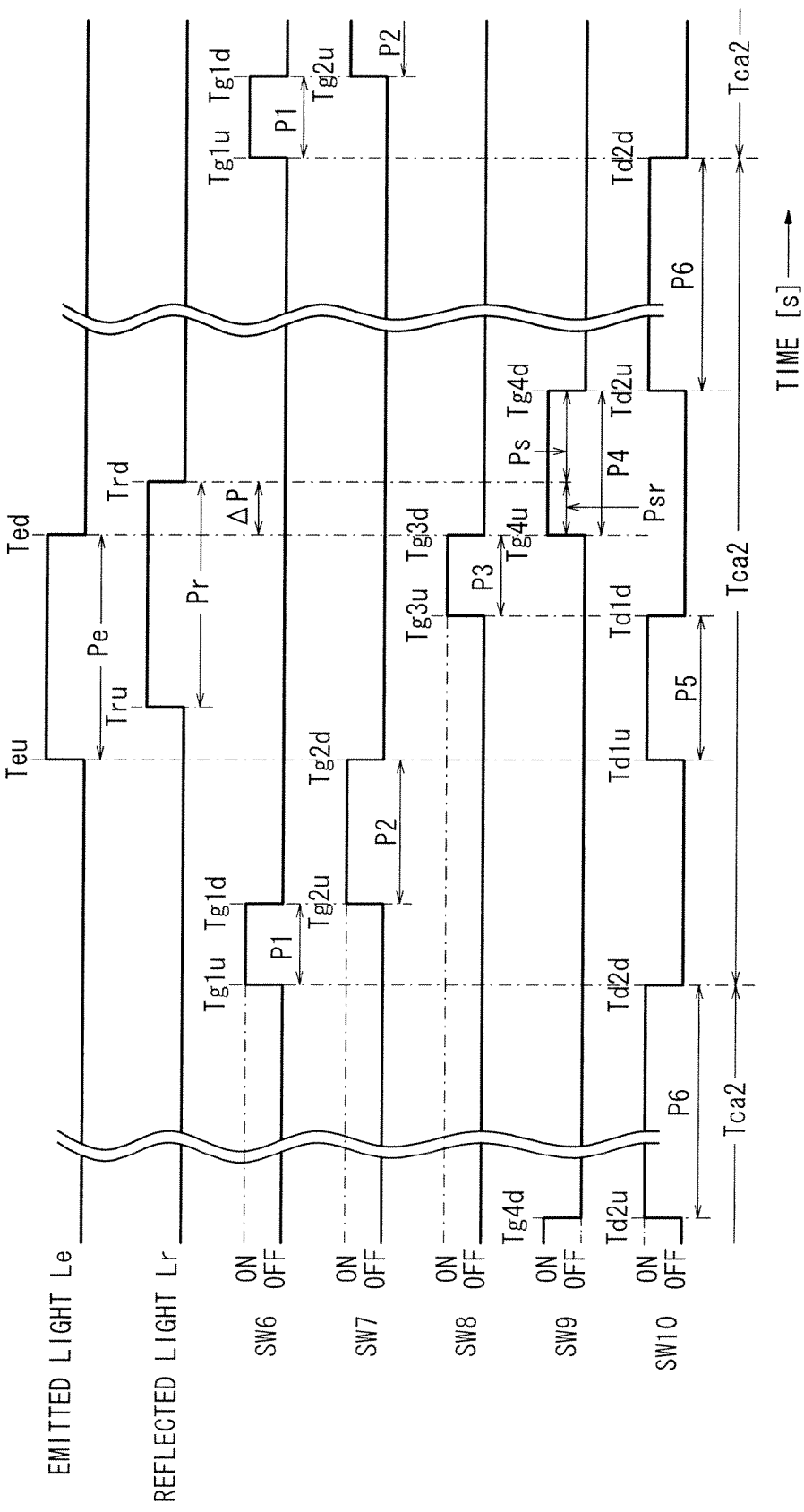
FIG. 10 is a timing chart of an example in which emitted light, reflected light, and sixth through tenth switching devices are turned on and off during each of respective second storage periods Tca2.

FIG. 10 is a timing chart showing an example in which emitted light Le, reflected light Lr, and the sixth through tenth switching devices SW6 through SW10 are turned on and off during the second storage period Tca2.

As described in detail later, the image capturing system 100 measures the distance z based on the fact that, assuming the reflected light Lr has a constant level of intensity Ir (W), then the period during which such reflected light Lr is applied to the photodetector 310 (reflected light applied period Psr) (s) is proportional to the accumulated amount of reflected light Lr in the reflected light applied period Psr (reflected light measured amount Amr) (J).

More specifically, the accumulated amount of light at a time when only ambient light Ls is applied to the photodetector 310 (ambient light reference amount Ars) (J) (amount Q1 of photoelectron stored in the sixth capacitor Ca6) is determined in period P1 as a first reference period. The accumulated amount of light at a time when ambient light Ls and reflected light Lr are both applied to the photodetector 310 (combined light reference amount Ari) (J) (amount Q3 of photoelectron stored in the eighth capacitor Ca8) is determined in period P3 (=P1) as a second reference period. The accumulated amount of light at a time when only ambient light Ls is applied to the photodetector 310 (ambient light measured amount Ams) (J) (amount Q2 of photoelectron stored in the seventh capacitor Ca7) is determined in period P2 as a first measurement period. The accumulated amount of light at a time ambient light Ls and reflected light Lr are both applied to the photodetector 310 (combined light measured amount Ami) (J) (amount Q4 of photoelectron stored in the ninth capacitor Ca9) is determined in period P4 (=P2) as a second measurement period. The period P4 includes a period (period Psr) during which both ambient light Ls and reflected light Lr are applied to the photodetector 310, and a period (period Ps) during which only ambient light Ls is applied to the photodetector 310. The period Psr is proportional to the distance z to the subject W. The periods P1, P2, P3, P4 jointly make up an exposure period for the second pixel 204b.

The ratio (Ari−Ars:Ami−Ams) of the difference between the combined light reference amount Ari and the ambient light reference amount Ars (reflected light reference amount Arr) (J) to the difference between the combined light measured amount Ami and the ambient light measured amount Ams (reflected light measured amount Amr) (J) is equal to the ratio (P3:Psr) of the period P3 (=P1) to the reflected light applied period Psr. Based on such equal ratios, the period (back-and-forth travel period ΔP) during which pulsed light Lp emitted from the light-emitting apparatus 102 hits the subject W and returns to the light-emitting apparatus 102 is determined. Then, the distance z between the light-detecting apparatus 110 and the subject W is determined based on the back-and-forth travel period ΔP.

(3) Details of the Measurement Process (During One Second Storage Period Tca2):

(a) Description of the Timing Chart:

In FIG. 10, time Teu refers a time at which emission of emitted light Le is started, time Ted refers to a time at which emission of the emitted light Le is stopped, period Pe refers to a period from time Teu to time Ted, time Tru refers to a time at which application of reflected light Lr to the photodetector 310 is started, time Trd refers to a time at which application of the reflected light Lr to the photodetector 310 is stopped, and period Pr refers to a period from time Tru to time Trd.

Times Tg1u, Tg2u, Tg3u, Tg4u refer to times at which the sixth through ninth switching elements SW6 through SW9 are turned on, respectively. Times Tg1d, Tg2d, Tg3d, Tg4d refer to times at which the sixth through ninth switching elements SW6 through SW9 are turned off, respectively. Period P1 refers to a period from time Tg1u to time Tg1d, period P2 refers to a period from time Tg2u to time Tg2d, period P3 refers to a period from time Tg3u to time Tg3d, and period P4 refers to a period from time Tg4u to time Tg4d. Period Psr refers to a period from Tg4u to time Trd, and period Ps refers to a period from time Trd to time Tg4d.

Times Td1u, Td2u refer to times at which the tenth switching element SW10 is turned on, whereas times Td1d, Td2d refer to times at which the tenth switching element SW10 is turned off. Period P5 refers to a period from time Td1u to time Td1d, and period P6 refers to a period from time Td2u to time Td2d.

Period Pr, during which reflected light Lr is applied to the photodetector 310, is equal to the period P3 (Pe=Pr) and can be set to a period ranging from 10 nanoseconds to 1 microsecond, for example, although a delay (back-and-forth travel period ΔP) occurs from time Teu to time Tru, or from time Ted to time Trd. In the image capturing system 100, period Pr is set to 100 nanoseconds. In the controller 114, the period P1 and the period P3 are set equal to each other, and the period P2 and the period P4 are set equal to each other (P1=P3 and P2=P4). Periods P1 and P3 can be set to a length ranging from 10 nanoseconds to 90 nanoseconds. In the image capturing system 100, the periods P1, P3 are set to 30 nanoseconds. The period P2 also can be set to a length ranging from 10 nanoseconds to 90 nanoseconds. In the image capturing system 100, period P2 is set to 70 nanoseconds. Period P5 can be set to a length ranging from 0 seconds to 90 nanoseconds. In the image capturing system 100, period P5 is set to 70 nanoseconds. Period P6 can be set to a length ranging from 10 microseconds to 1 millisecond. In the image capturing system 100, period P6 is set to about 100 microseconds. Among the periods P1 through P6, period P6 is quite long.

As shown in FIG. 10, in one second storage period Tca2 of the second pixel 204b of the image capturing system 100, the sixth switching element SW6 initially is turned on and energized for the period P1. At the same time that the sixth switching element SW6 is turned off, the seventh switching element SW7 is turned on and energized for the period P2. At the same time that the seventh switching element SW7 is turned off, the light emitter 140 begins to apply emitted light Le to the subject W, and the tenth switching element SW10 is turned on and energized for period P5. While the emitted light Le is output for the period P3, the emitted light Le begins to be applied to the photodetector 310 at time Tru. After elapse of period P5 from time Teu, at which the emitted light Le starts being emitted, the tenth switching element SW10 is turned off, and the eighth switching element SW8 is turned on and energized for the period P3. After elapse of the period P3, the light emitter 140 stops emitting the emitted light Le, and the eighth switching element SW8 is turned off, and the ninth switching element SW9 is turned on and energized for the period P4. While the ninth switching element SW9 is energized for the period P4, the reflected light Lr stops being applied to the photodetector 310 at time Trd. Stated otherwise, the period P4 determines a measurement range for the image capturing system 100, i.e., a distance (m) that can be measured by the image capturing system 100. At the same time that the ninth switching element SW9 is turned off, the tenth switching element SW10 is turned on and energized for period P6. Upon elapse of the period P6, the tenth switching element SW10 is turned off, and the second storage period Tca2 is terminated at time Td2d. At the same time, a next second storage period Tca2 is started, and the sixth switching element SW6 is turned on at time Tg1u. The controller 114 controls both the light-emitting apparatus 102 and the light-detecting apparatus 110. It the controller 114 is fabricated according to a semiconductor fabrication process, then preferably the controller 114 should be fabricated on the same silicon substrate as the light detector 124 according to a CMOS process, for purposes of temperature compensation, etc.

(b) Description of Measurement Principles:

(i) Calculation of the Reflected Light Reference Amount Arr:

If the image capturing system 100 and the subject W are fixed in position, then reflected light Lr that travels from the subject W to the image capturing system 100 has a constant level of intensity (amount of light per unit time). Since the period P1 is set to the period in which only ambient light Ls is applied to the photodetector 310, the sixth capacitor Ca6 stores photoelectrons generated solely with ambient light Ls. In addition, since the period P3 is set to the period in which both ambient light Ls and reflected light Lr are applied to the photodetector 310, the eighth capacitor Ca8 stores photoelectrons generated with both ambient light Ls and reflected light Lr. The period P1 and the period P3 are equal to each other.

Accordingly, the difference between the amount Q3 of photoelectron stored in the eighth capacitor Ca8 and the amount Q1 of photoelectron stored in the sixth capacitor Ca6 represents the accumulated amount of reflected light Lr during the period P3 (=P1) (reflected light reference amount Arr).

(ii) Calculation of the Reflected Light Measured Amount Amr and the Back-and-Forth Travel Period ΔP:

If the image capturing system 100 and the subject W are fixed in position, then reflected light Lr that travels from the subject W to the image capturing system 100 has a constant level of intensity. Since the period P2 is set to the period in which only ambient light Ls is applied to the photodetector 310, the seventh capacitor Ca7 stores photoelectrons generated solely with ambient light Ls. In addition, since the period P4 is set to the period, which includes the period (period Osr) in which both ambient light Ls and reflected light Lr are applied to the photodetector 310, and the period (period Ps) in which only ambient light Ls is applied to the photodetector 310, the ninth capacitor Ca9 stores photoelectrons generated with both ambient light Ls and reflected light Lr. The period P2 and the period P4 are equal to each other.

Accordingly, the difference between the amount Q4 of photoelectron stored in the ninth capacitor Ca9 and the amount Q7 of photoelectron stored in the seventh capacitor Ca7 represents the accumulated amount of reflected light Lr during the period P4 (=P2) (reflected light measured amount Amr). In the image capturing system 100, the period P4 starts with time Ted, at which the emitted light Le stops being emitted. Therefore, in the period P4, the reflected light Lr, which corresponds to the back-and-forth travel period ΔP, is applied to the photodetector 310, thereby storing photoelectrons in the ninth capacitor Ca9. The amount Q4 of photoelectron stored in the ninth capacitor Ca9 corresponds to the sum (combined light measured amount Ami) of the accumulated amount of ambient light Ls in the overall period (ambient light measured amount Ams) and the accumulated amount of reflected light Lr in the back-and-forth travel period ΔP (reflected light measured amount Amr). Consequently, the difference between the amount Q4 of photoelectron and the amount Q2 of photoelectron represents an amount of photoelectron that corresponds to the reflected light measured amount Amr. The back-and-forth travel period ΔP depends upon the distance z between the image capturing system 100 and the subject W. Therefore, the ratio (Amr:Arr=Q4−Q2: Q3−Q1=ΔP:P3) of the reflected light measured amount Amr (corresponding to the difference between the amount Q4 of photoelectron and the amount Q2 of photoelectron) to the combined light reference amount Arr (corresponding to the difference between the amount Q3 of photoelectron and the amount Q1 of photoelectron) is equal to the ratio of the back-and-forth travel period ΔP to the period P3 (=P1). The processor 112 calculates the back-and-forth travel period ΔP according to the following equation (F3):

$$\Delta P = \{(Q4-Q2)/(Q3-Q1)\} \times P3 \quad (F3)$$

(iii) Calculation of the distance z:

The processor 112 calculates the distance z between the image capturing system 100 and the subject W according to equation (F4) shown below. In equation (F4), c represents a constant indicative of the speed of light (about 300,000 kilometers/second). Also, the quantity c×ΔP is divided by 2, because the pulsed light Lp travels from the image capturing system 100 to the subject W and back again, for a distance that is twice the distance z in the back-and-forth travel period ΔP.

$$D = c \times \Delta P / 2 \quad (F4)$$

(iv) Others:

The second pixel 204b may be initialized (reset) according to the following process. First, the sixth through ninth resetting signals Sr6 through Sr9 are applied to the gates of the sixth through ninth resetting switches SR6 through SR9, i.e., high-level voltages are applied to the gates of the sixth through ninth resetting switches SR6 through SR9, in order to simultaneously turn on the sixth through ninth resetting switches SR6 through SR9. At the same time, the photoelectron discharging signal Se3 is applied to the gate of the tenth switching element SW10, i.e., a high-level voltage is applied to the gate of the tenth switching element SW10, in order to turn on the tenth switching element SW10. At this time, the gate drive signals Sg6 through Sg9 are not applied to the gates of the sixth through ninth switching elements SW6 through SW9, i.e., low-level signals are applied to the gates of the sixth through ninth switching elements SW6 through SW9, thereby turning off the sixth through ninth switching elements SW6 through SW9. The sixth through ninth capacitors Ca6 through Ca9 thus are set at the resetting voltage. After application of the sixth through ninth resetting signals Sr6 through Sr9 to the gates of the sixth through ninth resetting switches SR6 through SR9 has been stopped, i.e., when low-level voltages are applied to the gates of the sixth through ninth resetting switches SR6 through SR9, the processing sequence according to the timing chart shown in FIG. 10 is carried out.

(4) Details of the Measurement Process (in One First Storage Period Tca1):

In (2) and (3) described above, the measuring process that occurs in one second storage period Tca2 has been described. Actually, however, the image capturing system 100 calculates the back-and-forth travel period ΔP based on the amounts Q1 through Q4 of photoelectron (referred herein to as amounts sQ1 through sQ4 of photoelectron), which are stored respectively in the sixth through ninth capacitors Ca6 through Ca9 in one hundred second storage periods Tca2, i.e., in one first storage period Tca1, in the same manner as described above.

The amount sQ1 of photoelectron is determined as the sum of the amounts Q1 of photoelectron, which are stored in the sixth capacitor Ca6 in the first through hundredth second storage periods Tca2. Similarly, the amounts sQ2 through sQ4 of photoelectron are determined as the sums of the amounts Q1 through Q4 of photoelectron, which are stored in the seventh through ninth capacitors Ca7 through Sc9 in the first through hundredth second storage periods Tca2.

The processor 112 calculates the back-and-forth travel period ΔP according to the following equation (F5), which is based on the above equation (F3):

$$\Delta P = \{(sQ4-sQ2)/(sQ3-sQ1)\} \times P3 \quad (F5)$$

Based on the back-and-forth travel period ΔP determined according to equation (F5), the processor 112 calculates the distance z between the image capturing system 100 and the subject W.

Since the distance z is determined based on the amounts sQ1 through sQ4, which are stored in the respective sixth through ninth capacitors Ca6 through Ca9 in the one hundred second storage periods Tca2, signal light components are increased for thereby increasing accuracy during subsequent signal processing, i.e., for increasing the accuracy at which the distance z is calculated.

(5) Others:

The image capturing system 100 measures the distance z based on the amounts Q1 through Q4 of photoelectron (photoelectron information) from each of the plural second pixels 204b. The image capturing system 100 can produce a three-dimensional image by combining the distance information from the second pixels 204b.

Advantages of the Image Capturing System 100:

The image capturing system 100 thus arranged is capable of increasing the dynamic range for measurement of the distance z while reducing or eliminating the effects of ambient light Ls. Thus, the image capturing system 100 is capable of increasing the accuracy at which the distance z is measured.

More specifically, the image capturing system 100 determines the amount Q1 of photoelectron stored in the period P1, during which only ambient light Ls is applied to the photodetector 310, and the amount Q3 of photoelectron stored in the period P3, during which both ambient light Ls and reflected light Lr are applied to the photodetector 310. Since the period P1 and the period P3 are equal to each other, it is possible to determine the amount of photoelectron corresponding to the reflected light Lr in the period P3 (corresponding to the reflected light reference amount Arr in the period P3) from the difference between the amount Q3 of photoelectron and the amount Q1 of photoelectron (Q3−Q1).

The image capturing system 100 also determines the amount Q2 of photoelectron stored in the period P2, during which only ambient light Ls is applied to the photodetector 310, and the amount Q4 of photoelectron stored in the period P4. The period P4 includes the period (period Psr) in which both ambient light Ls and reflected light Lr are applied to the photodetector 310, and the period (period Ps) in which only ambient light Ls is applied to the photodetector 310. Since the period P2 and the period P4 are equal to each other, it is possible to determine the amount of photoelectron corresponding to the period Psr in period P4 (corresponding to the amount of reflected light Lr in period Psr) from the difference between the amount Q4 of photoelectron and the amount Q2 of photoelectron (Q4−Q2).

If the intensity Ir of reflected light Lr is constant while the reflected light Lr is applied to the photodetector 310, then the ratio of the difference between the amount Q4 of photoelectron and the amount Q2 of photoelectron to the difference between the amount Q3 of photoelectron and the amount Q1 of photoelectron (Q4−Q2:Q3−Q1) is equal to the ratio of the period Psr to the period P3 (Psr:P3). Therefore, the processor 112 can determine the period Psr according to the following equation (F6):

$$Psr = \{(Q4-Q2)/(Q3-Q1)\} \times P3 \quad (F6)$$

Since time Ted and time Tg4$u$ are equal to each other, the period Psr is equal to the back-and-forth travel period ΔP. Therefore, the back-and-forth travel period ΔP can be calculated from equation (F6), and the distance z can be determined based on the back-and-forth travel period ΔP and the speed of light.

Since the image capturing system 100 removes the amount Q2 of photoelectron produced by ambient light Ls, the effects of ambient light Ls can be reduced or eliminated.

As the distance z becomes smaller, the period in which reflected light Lr is applied, i.e., the period Psr, becomes smaller. Conversely, as the distance z becomes greater, the period Psr becomes greater. Generally, if the subject W remains the same, then the intensity Ir of reflected light Lr becomes greater as the distance z becomes smaller, and conversely, becomes smaller as the distance z becomes greater. If the distance z is made smaller, reflected light Lr of a greater intensity Ir is applied for a smaller period, whereas if the distance z is made greater, reflected light Lr of a smaller intensity Ir is applied for a greater period. As a result, a change in the amount Ar of reflected light Lr applied in the period Psr is smaller compared with the change in the distance z, thereby increasing the dynamic range of the image capturing system 100.

The image capturing system 100 emits one hundred light pulses Lp per each cycle Cm, stores photoelectrons one hundred times in the sixth through ninth capacitors Ca6 through Ca9, and calculates the back-and-forth travel period ΔP based on the amounts Q1 through Q4 of photoelectron stored in the sixth through ninth capacitors Ca6 through Ca9. Generally, ambient light Ls, e.g., sunlight, continuously varies in intensity. Since the image capturing system 100 emits one hundred light pulses Lp in each cycle Cm, stores photoelectrons one hundred times in the sixth through ninth capacitors Ca6 through Ca9, and calculates the back-and-forth travel period ΔP based on the stored amounts Q1 through Q4 of photoelectron, the intensity of such ambient light Ls can be averaged. As a result, the amount of photoelectron produced by ambient light Ls can be removed with high accuracy, and hence, the measurement accuracy of the back-and-forth travel period ΔP can be increased.

In the image capturing system 100, the pulse duration (output period) of the pulsed light Lp is 10 microseconds (100 nanoseconds×100), which is 0.05(%) of each cycle Cm (20 milliseconds). Accordingly, the periods P1 through P4 during which the sixth through ninth switching elements SW6 through SW9 are turned on are short. Therefore, even if other range finding apparatus using pulsed light of the same frequency are present near the image capturing system 100, such other range finding apparatus are less likely to output pulsed light in timed relation to the pulsed light Lp output by the image capturing system 100. As a consequence, such other range finding apparatus are less likely to interfere with the image capturing system 100, or stated otherwise, the image capturing system 100 is less liable to mistakenly recognize pulse light from such other range finding apparatus as the pulsed light Lp.

Since the periods P1 through P4 during which the sixth through ninth switching elements SW6 through SW9 are turned on are short, the periods during which ambient light Ls is applied to the photodetector 310 in the periods P1 through P4 also are short. Consequently, the effects of ambient light Ls as a source of noise are reduced, and hence, the signal-to-noise ratio (S/N) is increased. In particular, if the ambient light Ls is made up of sunlight, a shot noise caused by such sunlight can be reduced.

In the image capturing system 100, in each cycle Cm, the periods P1 through P4 during which the sixth through ninth switching elements SW6 through SW9 are turned on are short. Accordingly, the possibility that pulsed light Lp, which is emitted in a previous cycle Cm, will be detected in a present cycle Cm can be lowered. More specifically, since each second storage period Tca2 is 100 microseconds, and the period Pe during which pulsed light Lp is emitted is short, the pulsed light Lp is emitted at an interval of about 100 microseconds. Since the speed c of light is about 300,000 (kilometers/second), if the subject W is positioned at a location, which is 15 kilometers (=100 (μs)×30 (Mm/s)/2) farther than the distance z output by the image capturing system 100, then there is a possibility that aliasing may take place. However, since the intensity of the pulsed light Lp applied from the light emitter 140 toward the subject W is reduced depending on the square of the distance z, the intensity Ir of reflected light Lr from the location, which is 15 kilometers farther than the distance z, is much smaller than the intensity Ir of reflected light Lr from the subject W positioned at the distance z, and such reflected light Lr essentially cannot be detected by the photodetector 310. Therefore, the image capturing system 100 can function free of aliasing.

Another Timing Chart:

In the above embodiment, the controller 114 controls the sixth through ninth switching elements SW6 through SW9 according to the timing chart shown in FIG. 10. However, the controller 114 may control the sixth through ninth switching elements SW6 through SW9 in other ways. For example, the periods P3, P4 shown in FIG. 10 may occur prior to the periods P1, P2. Time Tg2$u$, which is shown in FIG. 10 as being simultaneous with time Tg1$d$, may be later than time Tg1$d$. Time Tg2$d$ and time Teu, as well as time Tg3$d$ and time Tg4$u$, also may be related to each other in the same fashion. Furthermore, time Tg4$u$ does not have to be simultaneous with time Ted, insofar as time Tg4$u$ is correlated with time Ted.

Figure 11:
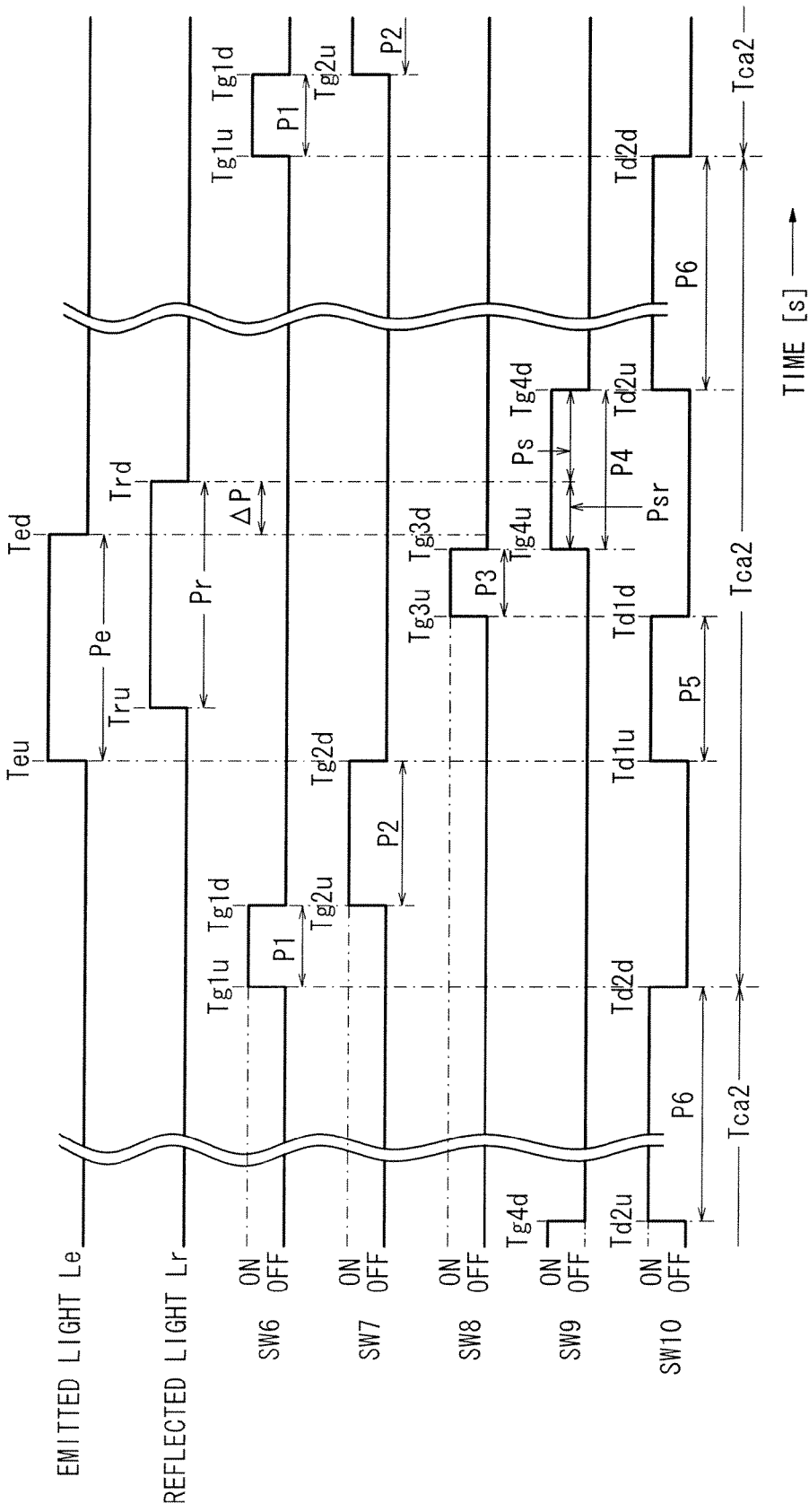
FIG. 11 is a timing chart of another example in which emitted light, reflected light, and sixth through tenth switching devices are turned on and off during each of respective second storage periods Tca2.

FIG. 11 is a timing chart, in which time Ted occurs later than time Tg4u. According to the timing chart shown in FIG. 11, the processor 112 can calculate the back-and-forth travel period ΔP according to the following equation (F7):

$$\Delta P=\{(Q4-Q2)/(Q3-Q1)\}\times P3-(Ted-Tg4u) \quad (F7)$$

Alternatively, time Ted may occur prior to time Tg4u. In such a case, the processor 112 can calculate the back-and-forth travel period ΔP according to the following equation (F8):

$$\Delta P=\{(Q4-Q2)/(Q3-Q1)\}\times P3+(Tg4u-Ted) \quad (F8)$$

In the above embodiment, the periods P1, P2 are introduced in order to reduce or eliminate effects from ambient light Ls. However, if the image capturing system 100 is installed in a location such as a dark room or the like, in which there is no ambient light Ls, or any ambient light is low in intensity and does not have significant effects on the reflected light, then the processor 112 can calculate the back-and-forth travel period ΔP from only the periods P3, P4. More specifically, the processor 112 can calculate the back-and-forth travel period ΔP according to the following equation (F9):

$$\Delta P=(Q4/Q3)\times P3 \quad (F9)$$

As described above, the image capturing system 100 is capable of measuring the distance z to the subject W based on signals from the second pixels 204b, which detect light transmitted through the fourth filters IR2.

Even if the second pixel 204b shown in FIG. 8 is employed, the first pixel 204a operates in the same manner as described above. Photoelectrons stored during the period in which the first pixel 204a detects reflected light Lr are discharged, and photoelectrons stored during the period in which the first pixel 204a does not detect reflected light Lr are output to the processor 112.

In the above embodiment, the first pixel 204a may be formed without the second switching element SW2 and the photoelectron discharger 302. If the first pixel 204a does not include the second switching element SW2 and the photoelectron discharger 302, then photoelectrons stored in the photoelectron storage 26 are not discharged. However, after photoelectrons, which have been stored in the photoelectron storage 26, are transferred to the first capacitor Ca1 through the first switch element SW1, the gate of the first resetting switch SR1 may be supplied with the first resetting signal Sr1, thereby setting the potential of the first capacitor Ca1 to the resetting voltage, or in other words, discharging the photoelectron that has been transferred to the first capacitor Ca1.

Although certain preferred embodiments of the present invention have been shown and described in detail, it should be understood that various changes and modifications may be made to the embodiments without departing from the scope of the invention as set forth in the appended claims.

What is claimed is:

1. An image capturing apparatus comprising:
an infrared cutoff filter;
an image capturing device having a plurality of pixels for detecting light transmitted through the infrared cutoff filter;
four optical filters disposed on a light-detecting surface of the image capturing device, the four optical filters having different filter characteristics; and
a processor for processing pixel signals generated by the pixels of the image capturing device;
wherein the four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than a fourth wavelength; and
the infrared cutoff filter transmits light having a wavelength shorter than a fifth wavelength;
the processor comprises:
a blue-component calculator for calculating a blue-component pixel signal by subtracting a pixel signal output from the pixel that detects light transmitted through the first filter from a pixel signal output from the pixel that detects light applied to the infrared cutoff filter;
a green-component calculator for calculating a green-component pixel signal by subtracting a pixel signal output from the pixel that detects light transmitted through the second filter from the pixel signal output from the pixel that detects light transmitted through the first filter; and
a red-component calculator for calculating a red-component pixel signal by subtracting a pixel signal output from the pixel that detects light transmitted through the third filter from the pixel signal output from the pixel that detects light transmitted through the second filter;
wherein the first wavelength, the second wavelength, the third wavelength, the fourth wavelength, and the fifth wavelength are related to each other such that the first wavelength<the second wavelength<the third wavelength<the fourth wavelength<the fifth wavelength.

2. An image capturing apparatus according to claim 1, wherein the fourth wavelength comprises a wavelength in the infrared range; and
the pixel that detects light transmitted through the fourth filter detects infrared radiation having a wavelength longer than the fourth wavelength and shorter than the fifth wavelength.

3. An image capturing system comprising:
an image capturing apparatus including:
an infrared cutoff filter;
an image capturing device having a plurality of pixels for detecting light transmitted through the infrared cutoff filter;
four optical filters disposed on a light-detecting surface of the image capturing device, the four optical filters having different filter characteristics; and
a processor for processing pixel signals generated by the pixels of the image capturing device;
wherein the four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than a fourth wavelength; and
the infrared cutoff filter transmits light having a wavelength shorter than a fifth wavelength;
the processor comprises:
a blue-component calculator for calculating a blue-component pixel signal by subtracting a pixel signal output from the pixel that detects light transmitted through the first filter from a pixel signal output from the pixel that detects light applied to the infrared cutoff filter;
a green-component calculator for calculating a green-component pixel signal by subtracting a pixel signal output from the pixel that detects light transmitted through the second filter from the pixel signal output from the pixel that detects light transmitted through the first filter; and a red-component calculator for calculating a red-component pixel signal by subtracting a pixel signal output from the pixel that detects light transmitted through the third filter from the pixel signal output from the pixel that detects light transmitted through the second filter;

wherein the first wavelength, the second wavelength, the third wavelength, the fourth wavelength, and the fifth wavelength are related to each other such that the first wavelength<the second wavelength<the third wavelength<the fourth wavelength<the fifth wavelength;

a controller for controlling the image capturing device; and a light-emitting apparatus for emitting infrared radiation toward a subject for a prescribed period, the infrared radiation including radiation having a wavelength longer than the fourth wavelength and shorter than the fifth wavelength;

wherein the image capturing device includes a plurality of first pixels for detecting the light applied to the infrared cutoff filter, the light transmitted through the first filter, the light transmitted through the second filter, and the light transmitted through the third filter, and a plurality of second pixels for detecting the light transmitted through the fourth filter; and the controller controls the first pixels so as not to store photoelectrons produced thereby during a first period in which reflected light of at least the radiation emitted from the light-emitting apparatus is applied to the image capturing device, and to store photoelectrons produced thereby during a second period in which reflected light is not applied to the image capturing device, for thereby obtaining luminance information of ambient light, which is independent of the reflected light.

4. An image capturing system according to claim 3, wherein each of the first pixels comprises:

a first photodetector;

a first capacitor for storing a photoelectron generated by the first photodetector;

a first switching element for transferring the photoelectron generated by the first photodetector to the first capacitor;

a first photoelectron discharger for discharging the photoelectron generated by the first photodetector; and a second switching element for discharging the photoelectron generated by the first photodetector from the first photoelectron discharger;

wherein the controller turns off the first switching element and turns on the second switching element in the first period to discharge the photoelectron generated by the first photodetector from the first photoelectron discharger, and turns off the second switching element and turns on the first switching element in the second period to transfer the photoelectron generated by the first photodetector to the first capacitor, for thereby obtaining the luminance information of the ambient light, which is independent of the reflected light, based on the amount of photoelectron stored in the first capacitor.

5. An image capturing system according to claim 3, wherein the controller controls the second pixels to expose second photodetectors of the second pixels during a third period in which the reflected light is not applied to the image capturing device and during a fourth period that is equal to the third period and in which at least the reflected light is applied to the image capturing device; and the processor obtains the luminance information of the ambient light, which is independent of the reflected light, by subtracting pixel signals produced by the second photodetectors in the third period from pixel signals produced by the second photodetectors in the fourth period.

6. An image capturing system according to claim 5, wherein each of the second pixels, which include the second photodetectors, comprises:

a second capacitor and a third capacitor for storing a photoelectron generated by the second photodetector;

a second photoelectron discharger for discharging the photoelectron generated by the second photodetector;

a third switching element for transferring the photoelectron generated by the second photodetector to the second capacitor;

a fourth switching element for transferring the photoelectron generated by the second photodetector to the third capacitor; and a fifth switching element for discharging the photoelectron generated by the second photodetector from the second photoelectron discharger;

wherein the controller turns off the fourth and fifth switching elements and turns on the third switching element in the third period to transfer the photoelectron generated by the second photodetector to the second capacitor, turns off the third and fifth switching elements and turns on the fourth switching element in the fourth period to transfer the photoelectron generated by the second photodetector to the third capacitor, and turns off the third and fourth switching elements and turns on the fifth switching element in a period other than the third period and the fourth period to discharge the photoelectron generated by the second photodetector from the second photoelectron discharger; and the processor obtains the luminance information of the ambient light, which is independent of the reflected light, by subtracting a pixel signal based on an amount of photoelectron transferred to the second capacitor from a pixel signal based on an amount of photoelectron transferred to the third capacitor.

7. An image capturing system according to claim 3, wherein the controller controls the second pixels to expose second photodetectors of the second pixels during a sixth period in which the reflected light is not applied to the image capturing device, a seventh period in which the reflected light is not applied to the image capturing device, an eighth period that is equal to the sixth period and in which at least the reflected light is applied to the image capturing device, and a ninth period from a time at which the light-emitting apparatus stops emitting infrared radiation to a time at which a period equal to the seventh period is completed;

the ninth period includes a period Psr in which the reflected light is applied to the image capturing device and a period Ps in which the reflected light is not applied to the image capturing device;

the processor acquires amount-of-light information of the reflected light in the eighth period by subtracting pixel signals produced by the second photodetectors in the sixth period from pixel signals produced by the second photodetectors in the eighth period;

the processor acquires amount-of-light information of the reflected light during the period Psr in which the light-emitting apparatus stops emitting infrared radiation and then the reflected light is applied to the image capturing device, by subtracting pixel signals produced by the second photodetectors in the seventh period from pixel signals produced by the second photodetectors in the ninth period; and the processor calculates a distance to the subject based on the ratio of the amount-of-light information of the reflected light in the eighth period and the amount-of-light information of the reflected light during the period Psr, and also based on the eighth period.

8. An image capturing system according to claim 7, wherein each of the second pixels further comprises:
- a sixth capacitor, a seventh capacitor, an eighth capacitor, and a ninth capacitor for storing a photoelectron generated by the second photodetector;
- a second photoelectron discharger for discharging the photoelectron generated by the second photodetector;
- a sixth switching element for transferring the photoelectron generated by the second photodetector to the sixth capacitor;
- a seventh switching element for transferring the photoelectron generated by the second photodetector to the seventh capacitor;
- an eighth switching element for transferring the photoelectron generated by the second photodetector to the eighth capacitor;
- a ninth switching element for transferring the photoelectron generated by the second photodetector to the ninth capacitor; and
- a tenth switching element for discharging the photoelectron generated by the second photodetector from the second photoelectron discharger;
- wherein the controller turns off the seventh through tenth switching elements and turns on the sixth switching element in the sixth period to transfer the photoelectron generated by the second photodetector to the sixth capacitor;
- the controller turns off the sixth switching element and the eighth through tenth switching elements and turns on the seventh switching element in the seventh period to transfer the photoelectron generated by the second photodetector to the seventh capacitor;
- the controller turns off the sixth and seventh switching elements and the ninth and tenth switching elements and turns on the eighth switching element in the eighth period to transfer the photoelectron generated by the second photodetector to the eighth capacitor;
- the controller turns off the sixth through eighth switching elements and the tenth switching element and turns on the ninth switching element to transfer the photoelectron generated by the second photodetector to the ninth capacitor;
- the controller turns off the sixth through ninth switching elements and turns on the tenth switching element in a period other than the sixth through ninth periods to discharge the photoelectron generated by the second photodetector from the second photoelectron discharger;
- the processor acquires the amount-of-light information of the reflected light in the eighth period by subtracting a pixel signal based on the amount of photoelectron transferred to the sixth capacitor from a pixel signal based on the amount of photoelectron transferred to the eighth capacitor; and
- the processor acquires the amount-of-light information of the reflected light in the period Psr by subtracting a pixel signal based on the amount of photoelectron transferred to the seventh capacitor from a pixel signal based on the amount of photoelectron transferred to the ninth capacitor.

9. An image capturing system according to claim 3, wherein the light-emitting apparatus emits infrared radiation in predetermined cyclic periods, and the controller and the processor operate in each of the predetermined cyclic periods.

10. An image capturing system according to claim 9, wherein the light-emitting apparatus emits infrared radiation as pulsed radiation for the prescribed period, the prescribed period being equal to or shorter than one percent of each of the predetermined cyclic periods.

11. A method of processing pixel signals in an image capturing apparatus including an infrared cutoff filter, an image capturing device having a plurality of pixels for detecting light transmitted through the infrared cutoff filter, and four optical filters disposed on a light-detecting surface of the image capturing device, the four optical filters having different filter characteristics, wherein the four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than a fourth wavelength, the infrared cutoff filter transmits light having a wavelength shorter than a fifth wavelength, and the first wavelength, the second wavelength, the third wavelength, the fourth wavelength, and the fifth wavelength are related to each other such that the first wavelength<the second wavelength<the third wavelength<the fourth wavelength<the fifth wavelength, the method comprising the steps of:
- calculating a blue-component pixel signal by subtracting a pixel signal output from the pixel that detects light transmitted through the first filter from a pixel signal output from the pixel that detects light applied to the infrared cutoff filter;
- calculating a green-component pixel signal by subtracting a pixel signal output from the pixel that detects light transmitted through the second filter from the pixel signal output from the pixel that detects the light transmitted through the first filter; and
- calculating a red-component pixel signal by subtracting a pixel signal output from the pixel that detects light transmitted through the third filter from the pixel signal output from the pixel that detects the light transmitted through the second filter.

12. A method of processing pixel signals in an image capturing system including an infrared cutoff filter, an image capturing device having a plurality of pixels for detecting light transmitted through the infrared cutoff filter, four optical filters disposed on a light-detecting surface of the image capturing device, the four optical filters having different filter characteristics, a controller for controlling the image capturing device, and a light-emitting apparatus for emitting infrared radiation toward a subject for a prescribed period, the infrared radiation including radiation having a wavelength longer than a fourth wavelength and shorter than a fifth wavelength, wherein the four optical filters include a first filter for transmitting light having a wavelength longer than a first wavelength, a second filter for transmitting light having a wavelength longer than a second wavelength, a third filter for transmitting light having a wavelength longer than a third wavelength, and a fourth filter for transmitting light having a wavelength longer than the fourth wavelength, the infrared cutoff filter transmits light having a wavelength shorter than the fifth wavelength, and the first wavelength, the second wavelength, the third wavelength, the fourth wavelength, and the fifth wavelength are related to each other such that the first wavelength<the second wavelength<the third wavelength<the fourth wavelength<the fifth wavelength, wherein the image capturing device includes a plurality of first pixels for detecting the light applied to the infrared cutoff filter, the light transmitted through the first filter, the light transmitted through the second filter, and the light transmitted through the third filter, and a plurality of second pixels for detecting the light transmitted through the fourth filter, the method comprising the steps of:

controlling the first pixels so as not to store photoelectrons produced thereby during a first period in which reflected light of at least the radiation emitted from the light-emitting apparatus is applied to the image capturing device, and to store photoelectrons produced thereby during a second period in which the reflected light is not applied to the image capturing device;

calculating a blue-component pixel signal by subtracting a pixel signal output from the pixel that detects light transmitted through the first filter from a pixel signal output from the pixel that detects light applied to the infrared cutoff filter;

calculating a green-component pixel signal by subtracting a pixel signal output from the pixel that detects light transmitted through the second filter from the pixel signal output from the pixel that detects the light transmitted through the first filter; and calculating a red-component pixel signal by subtracting a pixel signal output from the pixel that detects light transmitted through the third filter from the pixel signal output from the pixel that detects the light transmitted through the second filter.

\* \* \* \* \*